United States Patent
Toyama et al.

(10) Patent No.: US 9,382,335 B2
(45) Date of Patent: Jul. 5, 2016

(54) PROCESS FOR PRODUCING CELLULOSE DERIVATIVE AND CELLULOSE DERIVATIVE

(71) Applicant: NEC Corporation, Tokyo (JP)

(72) Inventors: Kiyohiko Toyama, Tokyo (JP); Masatoshi Iji, Tokyo (JP); Shukichi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/404,247

(22) PCT Filed: May 31, 2013

(86) PCT No.: PCT/JP2013/065218
§ 371 (c)(1),
(2) Date: Nov. 26, 2014

(87) PCT Pub. No.: WO2013/180278
PCT Pub. Date: Dec. 5, 2013

(65) Prior Publication Data
US 2015/0141639 A1    May 21, 2015

(30) Foreign Application Priority Data

May 31, 2012 (JP) ................................. 2012-125284

(51) Int. Cl.
| | |
|---|---|
| *C08B 3/10* | (2006.01) |
| *C08B 3/16* | (2006.01) |
| *C08B 3/22* | (2006.01) |
| *C08L 1/12* | (2006.01) |
| *C08L 1/14* | (2006.01) |
| *C08B 3/06* | (2006.01) |
| *C08B 3/00* | (2006.01) |
| *C08B 3/20* | (2006.01) |
| *C08L 1/10* | (2006.01) |
| *C08B 3/08* | (2006.01) |

(52) U.S. Cl.
CPC ... *C08B 3/06* (2013.01); *C08B 3/00* (2013.01); *C08B 3/08* (2013.01); *C08B 3/10* (2013.01); *C08B 3/16* (2013.01); *C08B 3/20* (2013.01); *C08B 3/22* (2013.01); *C08L 1/10* (2013.01); *C08L 1/12* (2013.01); *C08L 1/14* (2013.01)

(58) Field of Classification Search
CPC .................................... C08B 3/10; C08B 3/16
USPC .................................................... 536/82, 124
See application file for complete search history.

(56) References Cited

U.S. PATENT DOCUMENTS

| | | |
|---|---|---|
| 2012/0196998 A1 | 8/2012 | Iji et al. |
| 2012/0202926 A1 | 8/2012 | Iji et al. |
| 2013/0036940 A1 | 2/2013 | Tanaka et al. |

FOREIGN PATENT DOCUMENTS

| | | |
|---|---|---|
| CN | 101274964 A | 10/2008 |
| JP | 2007-051266 | 3/2007 |
| JP | 2010-121121 | 6/2010 |
| JP | 2010-254798 | 11/2010 |
| JP | 2011-016995 | 1/2011 |
| JP | 2011-132437 | 7/2011 |
| JP | 2011-213754 | 10/2011 |
| JP | 2012-021119 | 2/2012 |
| JP | 2012-219112 | 11/2012 |
| WO | WO 2011/043279 A1 | 4/2011 |
| WO | WO 2011/043280 A1 | 4/2011 |
| WO | WO 2011/111272 A1 | 9/2011 |
| WO | WO 2012/017769 A1 | 2/2012 |
| WO | WO 2012/017772 A1 | 2/2012 |

OTHER PUBLICATIONS

H. Matsumura et al., "Cellulosic Nanocomposites. I. Thermally Deformable Cellulose Hexanoates from Heterogeneous Reaction", J. Appl. Polym. Sci., vol. 78(13), pp. 2242-2253, 2000.
S. Tanaka et al., "Mechanical, thermal and hydrophobic properties of cellulose diacetate bonded with cardanol and aromatic components", Polymer Preprints, Japan vol. 61, No. 1, May 2012.
M. Iji et al., "Hydrophobic, mechanical and thermal characteristics of thermoplastic cellulose diacetate bonded with cardanol from cashew nutshell", Polymer Journal, vol. 43(8), Supplementary information, pp. 738-741, Jun. 2011.
International Search Report mailed Jun. 25, 2013 in corresponding PCT International Application.
Office Action issued by the Chinese Patent Office in counterpart Chinese Patent Application No. 201380028867.1, dated Nov. 23, 2015.

*Primary Examiner* — Patrick Lewis
*Assistant Examiner* — Everett White
(74) *Attorney, Agent, or Firm* — Finnegan, Henderson, Farabow, Garrett & Dunner LLP

(57) ABSTRACT

A process for producing a cellulose derivative, including reacting a reactant and a cellulose or a derivative thereof in a solid-liquid heterogeneous system to form a cellulose derivative containing a long-chain organic group having 5 or more carbon atoms introduced therein, in a swollen state, and performing solid-liquid separation to obtain the cellulose derivative containing a long-chain organic group introduced therein.

29 Claims, 5 Drawing Sheets

PROCESS FOR PRODUCING CELLULOSE DERIVATIVE AND CELLULOSE DERIVATIVE

CROSS-REFERENCE TO RELATED PATENT APPLICATIONS

This application is a National Stage Entry of International Application No. PCT/JP2013/065218, filed May 31, 2013, which claims priority from Japanese Patent Application No. 2012-125284, filed May 31, 2012. The entire contents of the above-referenced applications are expressly incorporated herein by reference.

TECHNICAL FIELD

The present invention relates to a process for producing a cellulose derivative and the cellulose derivative.

BACKGROUND ART

Bioplastic using a plant as a raw material can contribute to a countermeasure against petroleum depletion and global warming, and has been started being used not only in common products such as packaging, containers and fibers but also in durable products such as electronics and automobiles.

However, general bioplastics, such as polylactic acid, polyhydroxyalkanoate and modified starch, all use starch materials, more precisely, edible parts, as raw materials. Accordingly, for fear of future food shortage, it has been desired to develop a novel bioplastic using a non-edible part as a raw material.

As a raw material of a non-edible part, cellulose, which is a main component of wood and plant is representative, and various types of bioplastics using the cellulose have been already developed and commercialized.

However, since a step of chemically modifying cellulose to obtain a resin is complicated and laborious and much energy is required for production, manufacturing cost of a cellulose resin is high. In addition, since durability (strength, heat resistance, water resistance, etc.) of a produced resin is not sufficient, use of the resin is limited.

Cellulose is produced as pulp by chemically separating lignin and hemicellulose from wood, etc., with the help of a chemical agent. In contrast, cotton can be used as it is since it is virtually formed of cellulose. Such a cellulose, which is a high molecular weight compound formed by polymerization of β-glucose, has a large number of hydroxy groups and thus has strong intermolecular force due to hydrogen bonds. Because of this, cellulose is hard and fragile, and has no thermoplasticity and a low solubility in a solvent except a special solvent. In addition, due to a large number of hydrophilic hydroxy groups, water absorbability is high and water resistance is low.

For improving such properties of a cellulose, various investigations have been made.

As a method for improving the properties of a cellulose, a method of substituting a hydrogen atom of a hydroxy group in a cellulose with a short-chain acyl group such as an acetyl group is known. According to this method, since the number of hydroxy groups can be reduced, the intermolecular force of a cellulose can be reduced. A further investigation has been made for producing a cellulose derivative having satisfactory thermoplasticity and water resistance by introducing a long-chain organic group having a larger number of carbon atoms in addition to a short-chain acyl group such as an acetyl group.

For example, Patent Literature 1 describes a cellulose derivative produced by substituting at least a part of hydrogen atoms of hydroxy groups of a cellulose with a short-chain acyl group (for example, an aliphatic acyl group having 2 to 4 carbon atoms) and a long-chain acyl group (for example, an aliphatic acyl group having 5 to 20 carbon atoms), and that the cellulose derivative has a low water absorption rate, satisfactory thermoplasticity, strength and fracture elongation and is suitable for molding process.

Patent Literature 2 describes a cellulose derivative having cardanol introduced therein, and that the cellulose derivative was improved in thermoplasticity, mechanical characteristics and water resistance.

Patent Literature 3 describes a cellulose derivative having cardanol and abietic acid introduced therein, and that the cellulose derivative was improved in thermoplasticity, mechanical characteristics and water resistance.

CITATION LIST

Patent Literature

Patent Literature 1: JP2010-121121A
Patent Literature 2: WO2011/043279
Patent Literature 3: WO2011/043280

SUMMARY OF INVENTION

Technical Problem

Processes for producing a cellulose resin described in the above related art have a problem in that large energy load is required for a step of recovering a product. To explain more specifically, in these production processes, the product, i.e., a cellulose derivative, is produced but dissolved in a reaction solution. Thus, the product is obtained through solid-liquid separation by adding a large amount of a poor solvent, which scarcely dissolves the product, to the reaction solution to precipitate the product. Because of this, much energy is required for recovering a solvent, a catalyst, a reactant or its derivative from a large amount of reaction solution diluted with a poor solvent.

In the meantime, a cellulose is generally esterified with acetic acid by a process using a dissolving method, in which a product is dissolved in a solvent; however, it is known that the esterification can be also performed by a process using a non-dissolving method, in which a product is not dissolved in a solvent. However, in this process, it is possible to bind an acetyl group having a small number of carbon atoms but it was difficult to bind a long-chain organic group having a large number of carbon atoms.

An object of the present invention is to provide a process for producing a cellulose derivative improved in properties at a low cost and provide the cellulose derivative improved in properties.

Solution to Problem

According to an aspect of the present invention, there is provided a process for producing a cellulose derivative, including:
reacting a reactant and a cellulose or a derivative thereof in a solid-liquid heterogeneous system to form a cellulose derivative containing a long-chain organic group having 5 or more carbon atoms introduced therein, in a swollen state; and
performing solid-liquid separation to obtain a cellulose derivative containing the long-chain organic group introduced therein.

According to another aspect of the present invention, there is provided a cellulose derivative produced by the aforementioned production process.

According to another aspect of the present invention, there is provided a resin composition containing the aforementioned cellulose derivative.

According to another aspect of the present invention, there is provided a molded body obtained by molding the aforementioned resin composition.

Advantageous Effects of Invention

According to an exemplary embodiment, there is provided a process for producing a cellulose derivative improved in properties at a low cost, and provided the cellulose derivative improved in properties.

DESCRIPTION OF EMBODIMENTS

Figure 1:
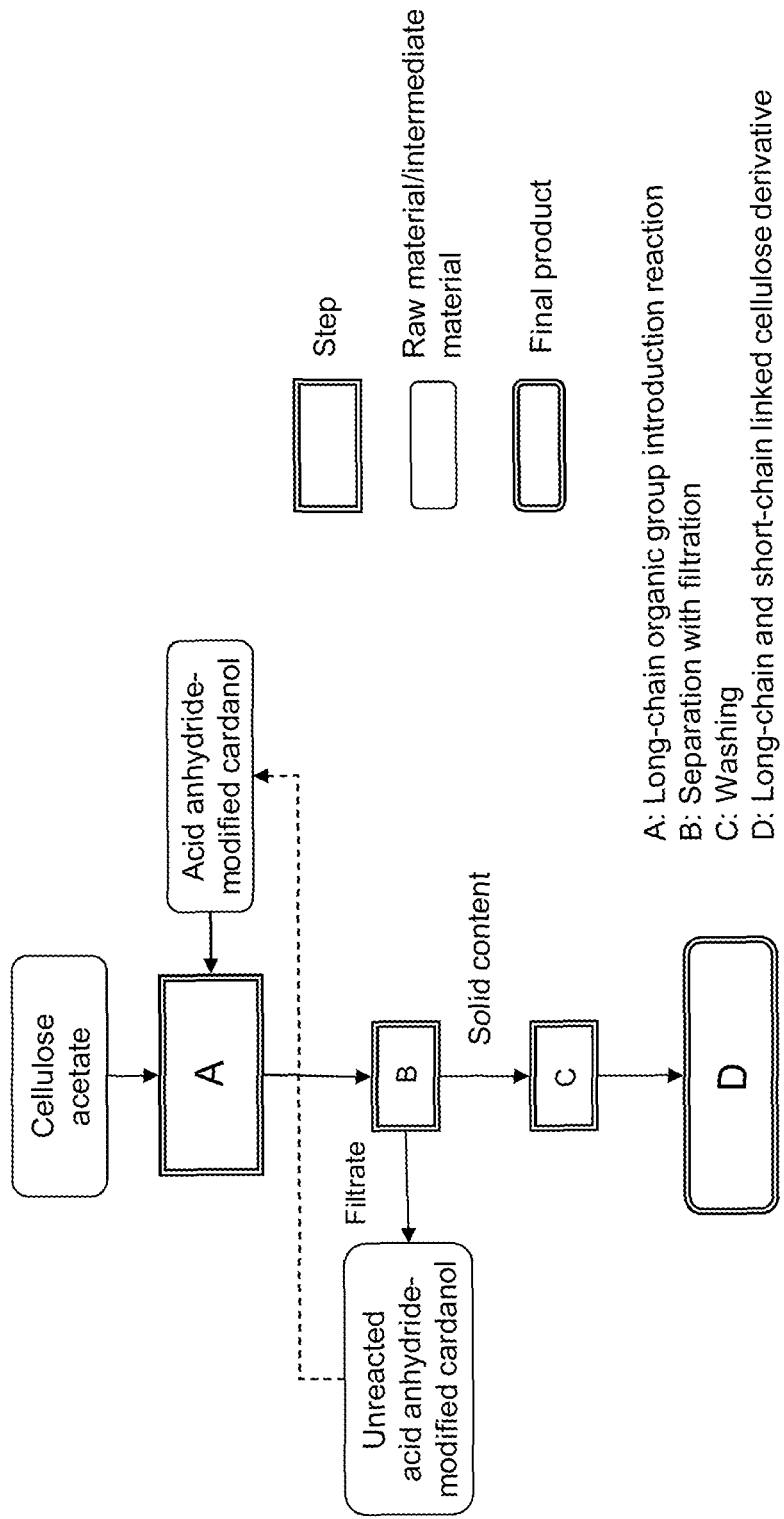
FIG. 1 is a process chart illustrating a Production Example of a cellulose derivative according to an exemplary embodiment of the present invention.

In a production process according to an exemplary embodiment of the present invention, a cellulose or a derivative thereof and a reactant are reacted in a solid-liquid heterogeneous system, and thereafter, solid-liquid separation is performed to obtain a desired cellulose derivative. According to the process, since a desired cellulose derivative obtained after completion of the reaction is not dissolved in a solution, a large amount of solvent for use in reprecipitation is not required, with the result that energy required for a recovery step of a solvent, etc., can be reduced. The solid content obtained after the solid-liquid separation is, if necessary, washed and dried by a routine method.

The reaction in a heterogeneous system for introducing a long-chain organic group is preferably performed in the state where the cellulose or a derivative thereof is impregnated with a reactant to swell a cellulose or a derivative thereof. It is preferable that a cellulose or a derivative thereof is appropriately swollen in the beginning of the reaction step; however, a cellulose or a derivative thereof may not be swollen in the beginning of the reaction step as long as a swollen state is obtained until completion of the reaction step. If an appropriate swollen state is obtained, a long-chain organic group having a larger number of carbon atoms can be easily introduced even in a solid-liquid heterogeneous system. At this time, the reaction is preferably performed in the conditions where a cellulose or a derivative thereof is hardly dissolved in a liquid phase.

The degree of swelling of a cellulose derivative having a long-chain organic group introduced therein preferably falls within the range of 10 to 300% at least at the time of completion of a reaction step (immediately before solid-liquid separation). Note that the degree of swelling can be determined in accordance with a measurement method described later. In view of reactivity, the degree of swelling is preferably 20% or more, more preferably 30% or more and particularly preferably 80% or more. In contrast, in view of the recovery rate of a product (solid content), the degree of swelling is preferably 200% or less, more preferably 150% or less and further preferably 100% or less.

Similarly in view of the recovery rate of a product (solid content), the solubility of a cellulose derivative having a long-chain organic group introduced therein in a reaction solution is preferably 10% by mass or less, further preferably 8% by mass or less and particularly preferably 5% by mass or less. As the solubility, for example, the solubility of the cellulose derivative produced in chloroform can be used as a standard. In this case, the solubility is preferably 10% by mass or less, further preferably 8% by mass or less and particularly preferably 5% by mass or less. The solubility herein refers to the mass ratio (percentage) of a solute (a cellulose derivative having a long-chain organic group introduced therein) dissolved in a saturated solution relative to the mass of the saturated solution at 20° C.

A cellulose or a derivative thereof before a long-chain organic group is introduced is preferably swollen at the time of the initiation of the reaction step of introducing a long-chain organic group in order to increase reactivity and the reaction efficiency. To easily create a swollen state, as a cellulosic material to which a long-chain organic group is to be introduced, a cellulose derivative is more preferably used than a cellulose. The degree of swelling at the time of initiating the reaction step for introducing a long-chain organic group falls within the range of 10 to 300%. In order to obtain, e.g., sufficient reactivity and reaction efficiency, the degree of swelling is preferably 20% or more, more preferably 30% or more and further preferably 40% or more. In contrast, in view of e.g., the recovery rate of a product, the degree of swelling is preferably 200% or less, more preferably 100% or less and further preferably 70% or less.

The reaction in a heterogeneous system for introducing a long-chain organic group may be performed in the presence of a solvent dissolving a reactant and an aprotic solvent is preferably used. Furthermore, a reaction catalyst may be used, in particular, a basic catalyst is preferable. Note that if a reactant itself is a liquid, a reaction in a solid-liquid heterogeneous system can be performed without using a solvent.

A cellulose or a derivative thereof before a reaction (before introduction of a long-chain organic group) and a cellulose derivative after completion of the reaction (after introduction of a long-chain organic group) preferably have a crosslinking site so as to suppress dissolution in a liquid phase and obtain an appropriate swollen state. As the crosslinking site, an intermolecular linking site that a cellulose inherently has is preferably used in view of simplicity of the process.

In the reaction in a solid-liquid heterogeneous system as mentioned above, as a process for introducing a long-chain organic group (particularly an organic group having 5 or more carbon atoms) to a cellulose or a derivative thereof, the following two processes are mentioned.

A first process (a two-stage reaction process) includes a step (first step) of introducing a short-chain organic group having 4 or less carbon atoms into a cellulose to form a short-chain linked cellulose derivative; and a step (second step) of introducing a long-chain organic group into the short-chain linked cellulose derivative. The short-chain linked cellulose derivative is preferably a short-chain acylated cellulose derivative obtained by substituting a part of hydrogen atoms of hydroxy groups of a cellulose with a short-chain acyl group.

As the short-chain organic group, an organic group having 2 to 4 carbon atoms is preferable and an acyl group having 2 to 4 carbon atoms is more preferable. The short-chain acyl group is more preferably an acetyl group or a propionyl group and may be both of these. An acetyl group is particularly preferable. As a reactant (short-chain reactant) for introducing a short-chain organic group, a reactant for introducing an organic group having 4 or less carbon atoms is preferable and a short-chain acylation agent for introducing a short-chain acyl group having 2 to 4 carbon atoms is more preferable. The short-chain acylation agent is preferably an acylation agent for introducing an acetyl group or an acylation agent for introducing a propionyl group and both of them may be used. An acylation agent for introducing an acetyl group is particularly preferable. As a reactant (long-chain reactant) for introducing a long-chain organic group, a reactant for introducing an organic group having 5 or more carbon atoms is preferable and a long-chain acylating agent for introducing a long-chain acyl group having 5 to 48 carbon atoms is more preferable.

The short-chain acylated cellulose derivative preferably has a crosslinking site in order to suppress dissolution in a liquid phase. The crosslinking site to be used is preferably an intermolecular linking site that a raw-material cellulose inherently has.

In the second process (single-stage reaction process), a long-chain reactant for introducing a long-chain organic group can be reacted with a cellulose in the presence or absence of a short-chain reactant for introducing a short-chain organic group in a solid-liquid heterogeneous system. If a short-chain reactant is used, a long-chain reactant and the short-chain reactant can be added simultaneously to perform a reaction; or the short-chain reactant is added first and a long-chain reactant may be added after the reaction of a part or whole of the short-chain reactant is completed. Alternatively, a long-chain reactant is added first and then a short-chain reactant may be added despite completion of the reaction.

The short-chain reactant is preferably a reactant for introducing an organic group having 4 or less carbon atoms and more preferably a short-chain acylation agent for introducing a short-chain acyl group having 2 to 4 carbon atoms. The short-chain acylation agent is more preferably an acylation agent for introducing an acetyl group or an acylation agent for introducing a propionyl group and both of these may be used. An acylation agent for introducing an acetyl group is particularly preferable. The long-chain reactant is preferably a reactant for introducing an organic group having 5 or more carbon atoms and more preferably a long-chain acylating agent for introducing a long-chain acyl group having 5 to 48 carbon atoms.

The first process includes two steps: a step of introducing a short-chain organic group into a cellulose and a step of introducing a long-chain organic group into a cellulose derivative having the short-chain organic group introduced therein; whereas in the second process, both a short-chain organic group and a long-chain organic group are simultaneously introduced. Thus, if the second process is employed, the process can be simplified. In addition, a cellulose having hydroxy groups, whose hydrogen atoms are not substituted can be used as a starting cellulose or a derivative thereof, reducing material cost. In contrast, in the first process, reactivity and reaction efficiency for introducing a long-chain organic group are high compared to those of the second process. In addition, since introduction of a short-chain organic group and introduction of a long-chain organic group are carried out in separate steps, the introduction ratio of the short-chain organic group and the long-chain organic group is relatively easily controlled.

As the long-chain acylating agent used in the first process and the second process, a cardanol derivative can be used and the cardanol derivative preferably has an acid anhydride group. The acid anhydride group is favorable as a functional group to be reacted with a hydroxy group of a cellulose.

The starting cellulose or a derivative thereof to be used in the aforementioned production processes may be subjected to an activation treatment. Owing to this treatment, reactivity can be enhanced. As the activation treatment, an activation treatment routinely performed to a cellulose can be applied. After completion of the activation treatment, the liquid (protonic solvent such as acetic acid) used in the activation treatment may be substituted with a liquid (for example, an aprotic solvent) which does not inhibit the reaction between a cellulose or a derivative thereof and a reactant. If a solvent is used in the reaction in a solid-liquid heterogeneous system between a cellulose or a derivative thereof and a reactant, substitution can be made with the solvent.

According to the embodiment of obtaining a cellulose derivative by performing a reaction in a solid-liquid heterogeneous system and performing solid-liquid separation, it is possible to obtain a cellulose derivative different in mechanical characteristic compared to the cellulose derivative obtained by performing a reaction in a solution state and performing reprecipitation. By use of a resin composition containing such a cellulose derivative, a molded body improved in mechanical characteristic can be obtained.

In the production process according to the embodiment, a step of dissociating a crosslinking site can be further carried out after completion of the solid-liquid separation. Owing to this step, mechanical characteristics of the obtained cellulose derivative can be improved.

The exemplary embodiment of the present invention will be further described, below.

[Cellulose]

Cellulose is a straight-chain polymer of β-glucose, represented by the following formula (1) and each glucose unit has three hydroxy groups (where n represents a natural number). In the production process according to the embodiment of the present invention, using these hydroxy groups, a short-chain organic group and a long-chain organic group can be introduced into the cellulose or a derivative thereof.

[Formula 1]

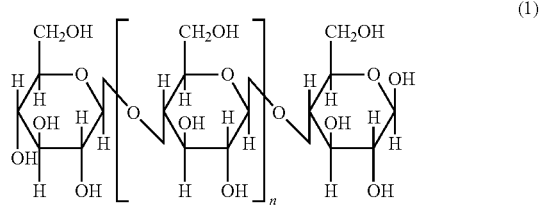

(1)

Cellulose is a main component of plants and can be obtained by a separation treatment for removing other components such as lignin from plants. Other than those thus obtained, cotton (for example, cotton linters) having a high cellulose content and pulp (for example, wood pulp) can be used directly or after they are purified. As the shape, size and form of the cellulose or a derivative thereof to be used as a raw material, a powder form cellulose or a derivative thereof having an appropriate particle size and particle shape is preferably used in view of reactivity, solid-liquid separation and handling. For example, a fibrous or powdery cellulose or a derivative thereof having a diameter of 1 to 100 μm (preferably 10 to 50 μm) and a length of 10 μm to 100 mm (preferably 100 μm to 10 mm) can be used.

The polymerization degree of cellulose in terms of degree of polymerization of glucose (average polymerization degree) preferably falls within the range of 50 to 5000, more preferably 100 to 3000 and further preferably 500 to 3000. If the polymerization degree is extremely low, the strength and heat resistance of the produced resin may not be sufficient in some cases. Conversely, if the polymerization degree is extremely high, the melt viscosity of the produced resin is extremely high, interfering with molding in some cases.

Cellulose may be mixed with chitin or chitosan having an analogous structure. When cellulose is mixed with them, the amount thereof is preferably 30% by mass or less relative to the total amount of mixture, preferably 20% by mass or less and further preferably 10% by mass or less.

The description in the above is directed to cellulose; however, the present invention is applicable to analogs of the cellulose, such as general non-edible polysaccharides, i.e., chitin, chitosan, hemicellulose, glucomannan and curdlan.

[Short-Chain Organic Group]

In the process for producing a cellulose derivative according to an exemplary embodiment of the present invention, a short-chain organic group can be introduced using a hydroxy group of a cellulose.

The short-chain organic group can be introduced by reacting a hydroxy group of a cellulose with a short-chain reactant. The short-chain organic group corresponds to an organic group moiety introduced in place of a hydrogen atom of a hydroxy group of a cellulose. The short-chain reactant is a compound having at least one functional group capable of reacting with a hydroxy group of a cellulose. Examples thereof include hydrocarbon compounds having a carboxyl group, a carboxylic acid halide group, a carboxylic acid anhydride group, an isocyanate group, a chloroformate group, an epoxy group, or a halogen group bound thereto. Specific examples thereof include an aliphatic monocarboxylic acid, and an acid halide or acid anhydride thereof; an aliphatic monoisocyanate; an aliphatic monochloroformate; aliphatic monoepoxide; and aliphatic monohalide.

As the aliphatic monocarboxylic acid, a straight or branched (having a side chain) fatty acid is mentioned. Examples of the aliphatic monoisocyanate include an aliphatic monoisocyanate having an isocyanate group bound to a straight or branched (having a side chain) aliphatic hydrocarbon. Examples of the aliphatic monochloroformate include an aliphatic monochloroformate having a chloroformate group bound to a straight or branched (having a side chain) aliphatic hydrocarbon. Examples of the aliphatic monoepoxide include an aliphatic monoepoxide having an epoxy group bound to a straight aliphatic hydrocarbon. Examples of the aliphatic monohalide include an aliphatic monohalide having a halogen group bound to a straight or branched (having a side chain) aliphatic hydrocarbon.

The short-chain organic group preferably has 2 to 4 carbon atoms and more preferably 2 or 3 carbon atoms. A hydrogen atom of a hydroxy group of a cellulose is preferably substituted with an acyl group having 2 to 4 carbon atoms. The acyl group is preferably an acetyl group or a propionyl group. The acyl group may include both of these. The acyl group is particularly preferably an acetyl group.

The substitution degree with a short-chain organic group ($DS_{SH}$) (average value), i.e. the number of hydroxy groups substituted per glucose unit of cellulose (the degree of substitution of the hydroxy groups) (average value) can be set at 0.1 to 2.9 and preferably 0.5 to 2.5.

By introducing the aforementioned short-chain organic group into a cellulose, the intermolecular force (intermolecular bond) of a cellulose can be reduced. Furthermore, a cellulose derivative having a short-chain organic group introduced therein is improved in affinity for a solvent or a liquid phase of a reaction in a solid-liquid heterogeneous system; with the result that the cellulose derivative can be appropriately swollen and the reaction efficiency for introducing a long-chain organic group can be increased.

[Long-Chain Organic Group]

In a process for producing a cellulose derivative according to an exemplary embodiment of the present invention, a long-chain organic group can be introduced by use of a hydroxy group of a cellulose.

The long-chain organic group can be introduced by reacting a hydroxy group of a cellulose with a long-chain reactant. The long-chain organic group corresponds to an organic group moiety introduced in place of a hydrogen atom of a hydroxy group of a cellulose. Furthermore, the long-chain organic group can be bound to a cellulose via an ester bond, an ether bond, a urethane bond or a carbonate bond.

The long-chain reactant is a compound having at least one functional group capable of reacting with a hydroxy group of a cellulose. If the bond is an ester bond, a compound having a carboxyl group, a carboxylic acid halide group or a carboxylic acid anhydride group can be used as the long-chain reactant. If the bond is an ether bond, a compound having an epoxy group or a halogen group can be used as the long-chain reactant. If the bond is a urethane bond, a compound having an isocyanate group can be used as the long-chain reactant. If the bond is a carbonate bond, a compound having a chloroformate group can be used as the long-chain reactant.

The long-chain reactant may further contain an ester bond, an ether bond, a urethane bond, a carbonate bond and an amide bond in a molecular structure other than the above functional group(s). Furthermore, the long-chain reactant may contain at least one structure selected from structures of a chain hydrocarbon, an aromatic hydrocarbon and an alicyclic hydrocarbon and may contain a structure of combination of these.

As the long-chain reactant, for example, a carboxylic acid having 5 to 24 carbon atoms and a halide or acid anhydride of the carboxylic acid can be used. The unsaturation degree and the position of an unsaturation bond of these carboxylic acids or carboxylic acid derivatives are not particularly limited. Specific examples of the carboxylic acids, for example, include pentanoic acid, caproic acid, enanthic acid, caprylic acid, pelargonic acid, capric acid, lauric acid, myristic acid, pentadecyl acid, palmitic acid, palmitoleic acid, margaric acid, stearic acid, oleic acid, vaccenic acid, linoleic acid, linolenic acid, eleostearic acid, tuberculostearic acid, arachidic acid, arachidonic acid, eicosenoic acid, behenic acid, erucic acid, lignoceric acid, hexadecadiene acid, hexadecatrienoic acid, octadecatetraenoic acid, octadecapentaenoic acid, icosatetraenoic acid, icosapentaenoic acid, docosapentaenoic acid and docosahexaenoic acid. Furthermore, as the carboxylic acid, a carboxylic acid obtained from a natural product is preferred in consideration of environment harmoniousness.

A long-chain organic group can be also formed by binding a compound low in direct reactivity to a hydroxy group of cellulose, like a hydroxy compound, to cellulose by use of a multifunctional compound. For example, the multifunctional compound and a hydroxy compound can be bound by using a hydroxy group of the hydroxy compound and a functional group of the multifunctional compound; and binding the obtained hydroxy compound derivative and a cellulose by using a hydroxy group of the cellulose and a functional group derived from the multifunctional compound. As the hydroxy compound, an alcohol and a phenol can by mentioned. As the phenol, for example, cardanol or a cardanol derivative obtained by hydrogenating an unsaturated bond of the straight-chain hydrocarbon moiety is mentioned.

The above multifunctional compound preferably contains a hydrocarbon group. The number of carbon atoms of the hydrocarbon group is preferably 1 or more and more preferably 2 or more; and preferably 20 or less, more preferably 14 or less and further preferably 8 or less. If the number of carbon atoms is extremely large, the size of the molecule is excessively large, reducing the reactivity, with the result that it is sometimes difficult to increase a reaction rate. As such a hydrocarbon group, a divalent group is preferable. Examples thereof include divalent straight-chain aliphatic hydrocarbon groups (particularly, a straight-chain alkylene group) such as a methylene group, an ethylene group, a propylene group, a butylene group, a pentamethylene group, a hexamethylene group, a heptamethylene group, an octamethylene group, a decamethylene group, a dodecamethylene group and a hexadecamethylene group; divalent alicyclic hydrocarbon groups such as cycloheptane ring, a cyclohexane ring, a cyclooctane ring, a bicyclopentane ring, a tricyclohexane ring, a bicyclooctane ring, a bicyclononane ring and a tricyclodecane ring; divalent aromatic hydrocarbon groups such as a benzene ring, a naphthalene ring and a biphenylene group; and divalent groups obtained by combining these.

As the functional group of a multifunctional compound as mentioned above, a group selected from a carboxyl group, a carboxylic acid anhydride group, a carboxylic acid halide group (particularly, carboxylic acid chloride group), an epoxy group, an isocyanate group and a halogen group, is preferable. Of them, a carboxyl group, a carboxylic acid anhydride group, a halogen group (particularly, a chloride group) and an isocyanate group are preferable. If a cardanol or a hydrogenated cardanol is used as the hydroxy compound, as the functional group to be reacted with a phenolic hydroxy group thereof, particularly, a carboxylic acid anhydride group, a halogen group (particularly, a chloride group) and an isocyanate group are preferable. As the functional group to be reacted with a hydroxy group of cellulose, particularly a carboxylic acid anhydride group, a carboxylic acid halide group (particularly, a carboxylic acid chloride group) and an isocyanate group are preferable. The carboxylic acid anhydride group can be formed by converting a carboxyl group into an acid anhydride. The carboxylic acid halide group can be formed by converting a carboxyl group into an acid halide.

As specific examples of such a multifunctional compound, dicarboxylic acid, carboxylic acid anhydride, dicarboxylic acid halide, monochlorocarboxylic acid and diisocyanates can be mentioned. Examples of dicarboxylic acid include malonic acid, succinic acid, glutaric acid, pimelic acid, suberic acid, azelaic acid, sebacic acid, dodecane dicarboxylic acid, pentadecane dicarboxylic acid and hexadecane dicarboxylic acid. Examples of the carboxylic acid anhydride include anhydrides of dicarboxylic acids of these. Examples of the dicarboxylic halide include acid halides of these dicarboxylic acids. Examples of the monochlorocarboxylic acid include monochloro acetate, 3-chloropropionate, 3-fluoropropionic acid, 4-chlorobutyric acid, 4-fluorobutyric acid, 5-chlorovaleric acid, 5-fluorovaleric acid, 6-chlorohexanoic acid, 6-fluorohexanoic acid, 8-chlorooctanoic acid, 8-fluorooctanoic acid, 12-chlorododecanoic acid, 12-fluorododecanoic acid, 18-chlorostearic acid and 18-fluorostearic acid. Examples of the diisocyanates include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexyl methane diisocyanate (HMDI; hydrogenated MDI). Of them, as isocyanates, 4,4'-diphenylmethane diisocyanate (MDI) and 1,6-hexamethylene diisocyanate (HDI) can be preferably used.

As the long-chain organic group, a long-chain organic group having 5 or more carbon atoms is included, and a long-chain organic group having 7 or more carbon atoms is preferable, a long-chain organic group having 8 or more carbon atoms is more preferable, a long-chain organic group having 12 or more carbon atoms is further preferable and a long-chain organic group having 16 or more carbon atoms is particularly preferable in order to obtain sufficient introduction effect of a long-chain organic group. In view of reaction efficiency at the time a long-chain organic group is introduced, a long-chain organic group having 48 or less carbon atoms is preferable, a long-chain organic group having 36 or less carbon atoms is more preferable and a long-chain organic group having 25 or less carbon atoms is particularly preferable. An obtained cellulose derivative may have a single type of long-chain organic group, or may have two or more types of long-chain organic group. If a desired cellulose derivative has both a short-chain organic group and a long-chain organic group, in order to sufficiently obtain the effect expected from introduction of a short-chain organic group and the effect expected from introduction of a long-chain organic group, the difference between the number of carbon atoms of a short-chain organic group and the number of carbon atoms of a long-chain organic group is preferably 2 or more, more preferably 3 or more and further preferably 5 or more.

The number of long-chain organic groups introduced as substituents per glucose unit of cellulose ($DS_{LO}$) (an average value), in other words, the number of hydroxy groups substituted per glucose unit of cellulose (the degree of substitution of the hydroxy groups) (an average value) can be appropriately set depending upon the structure and introduction amount of short-chain organic group and the structure of long-chain organic group, and physical properties required for a desired product, and can be set within the range of 0.1 to 2.9 and preferably within the range of 0.1 to 1.5.

The properties of a cellulose or a derivative thereof can be improved by introducing a long-chain organic group as mentioned above into the cellulose or a derivative thereof. More specifically, water resistance and thermoplasticity can be improved.

[Crosslinking Site in Cellulose Derivative]

In a production process according to an exemplary embodiment of the present invention, a starting cellulose or a derivative thereof and a cellulose derivative after completion of the reaction preferably have a crosslinking site so as to suppress dissolution in a liquid phase (or solvent) and obtain an appropriate swollen state.

The crosslinking site refers to an intramolecular bond of cellulose (or a derivative thereof) including a chemical bond and a physical bond. Examples of the bond include a hydrogen bond between hydroxy groups of cellulose and a hydrogen bond between a hydroxy group of cellulose (or a derivative thereof) and an organic group introduced. As the crosslinking site, a crosslinking site derived from a crystal of cellulose can be used. Furthermore, the crosslinking site includes a bond due to tangling between main chains of cellulose (or derivatives thereof) and may be tangling between mutual organic groups introduced and tangling between a main chain of cellulose (or a derivative thereof) and an organic group introduced. The crosslinking site may be an aggregation site of a part of a cellulose derivative, which is formed as a result that affinity to a solvent is changed by introduction of an organic group, i.e., affinity to a solvent is locally reduced. The crosslinking site may be bond of a crosslinking agent capable of binding to a reactive functional group of cellulose and may be a bond of a crosslinking agent capable of physically binding to a cellulose molecular chain. The crosslinking agent may be an impurity derived from a plant raw material such as hemicellulose and lignin. The crosslinking site may be constituted of a combination of two or more binding sites.

It is sometimes difficult to directly measure the amount of crosslinking sites present depending on the binding structure as mentioned above; however, the amount can be indirectly measured and can be set to fall within a desired range. The amount of crosslinking site present can be indirectly determined by determining a degree of swelling of a cellulose derivative in a solvent having affinity to the cellulose derivative, for example, can be determined by a method for determining a degree of swelling (described later).

[Remaining Amount of Hydroxy Group in a Cellulose Derivative]

As the amount of hydroxy group increases, maximum strength and heat resistance of a cellulose derivative tend to increase; whereas water absorbability tends to increase. As the conversion rate (degree of substitution) of hydroxy groups increases, water absorbability tends to decrease, plasticity and breaking strain tend to increase; whereas, maximum strength and heat resistance tend to decrease. In consideration of these tendencies and, reaction conditions of the short-chain reactant and the long-chain reactant, the conversion rate of hydroxy groups can be appropriately set.

The number of remaining hydroxy groups per glucose unit of a long-chain and short-chain linked cellulose derivative (hydroxy group remaining degree) (average value) can be set within the range of 0 to 2.8. In view of e.g., maximum strength and heat resistance, hydroxy group may remain; for example, the hydroxy group remaining degree may be 0.01 or more and further 0.1 or more.

[Production Process]

Now, a production process according to an exemplary embodiment of the present invention will be described below.

[Activation of Cellulose]

Before the reaction step for introducing a short-chain organic group and a long-chain organic group into cellulose, an activation treatment (pretreatment step) can be performed in order to increase the reactivity of cellulose. As the activation treatment, an activation treatment which is routinely performed before acetylation of a cellulose can be applied.

In the activation treatment employed in the production process according to an exemplary embodiment of the present invention, a cellulose is swollen by bringing the cellulose into contact with a solvent, for example, by a method of spraying an activation solvent having affinity for a cellulose to the cellulose or by a method (soaking method) of soaking a cellulose in an activation solvent. Owing to the treatment, a reactant easily penetrates between cellulose molecular chains (if a solvent and a catalyst are used, a reactant easily penetrates together with these), with the result that the reactivity of the cellulose improves. Herein, examples of the activation solvent include water; carboxylic acids such as acetic acid, propionic acid, butyric acid, valeric acid, caproic acid, enanthic acid, caprylic acid and pelargonic acid; alcohols such as methanol, ethanol, propanol and isopropanol; nitrogen-containing compounds such as dimethylformamide, formamide and ethanolamine; and sulfoxide compounds such as dimethylsulfoxide. These can be used in combination of two or more types. Particularly preferably, water and acetic acid can be used.

The use amount of activation solvent relative to a cellulose (100 parts by mass) can be set to be, for example, 10 parts by mass or more, preferably 20 parts by mass or more and more preferably 30 parts by mass or more. If a cellulose is soaked in an activation solvent, the use amount of activation solvent relative to the cellulose in term of mass, can be set to be, for example, the same or more, preferably 5 times or more and more preferably 10 times or more. In view of load for removing the activation solvent after the pretreatment and cost reduction of materials, the use amount of activation solvent is preferably 300 times or less, more preferably 100 times or less and further preferably 50 times or less.

The temperature of the activation treatment can be appropriately set within the range of, for example, 0 to 100° C. In view of the efficiency of activation and reduction of energy cost, the temperature is preferably 10 to 40° C. and more preferably 15 to 35° C.

The time for the activation treatment can be appropriately set within the range of, for example, 0.1 hour to 72 hours. In order to perform sufficient activation and reduce the treatment time, the time is preferably 0.1 hour to 24 hours and more preferably 0.5 hours to 3 hours.

After the activation treatment, an excessive activation solvent can be removed by a solid-liquid separation method such as suction filtration.

If a solvent is used in a reaction for introducing an organic group, the activation solvent contained in a cellulose can be substituted with the solvent to be used in the reaction after the activation treatment. For example, a substitution treatment can be performed in accordance with the above mentioned soaking method for the activation treatment by changing the activation solvent to the solvent to be used in the reaction.

[Introduction of Short-Chain Organic Group: First Step of Two-Stage Reaction Process (First Process)]

A cellulose or a cellulose to which an activation treatment as mentioned above is previously applied, is first subjected to a step (first step) of introducing a short-chain organic group and thereafter to a step (second step) of introducing a long-chain organic group.

In the first step, a short-chain reactant as mentioned above, if necessary, a solvent and a catalyst are mixed with a cellulose. The cellulose and the short-chain reactant can be reacted in a solid-liquid heterogeneous system. At this time, if necessary, heating or stirring can be performed. In this reaction, the hydroxy groups of a cellulose are not all substituted with a short-chain organic group and a part of the hydroxy groups are allowed to remain by controlling the starting amount of short-chain reactant and reaction conditions such as reaction time.

In the first step, a cellulose is soaked in a reaction solution containing the short-chain reactant to swollen the cellulose. The cellulose in this state can be reacted. Owing to this, the short-chain reactant can easily penetrate between cellulose molecular chains, with the result that the reactivity improves.

The use amount of reaction solution relative to the cellulose in terms of mass can be set to be, for example, the same or more, preferably five times or more, and more preferably 10 times or more. In view of e.g., load for removing the reaction solution after completion of the reaction and cost reduction of materials, the use amount is preferably 300 times or less, more preferably 100 times or less and further preferably 50 times or less.

The reaction temperature is preferably 10° C. or more, more preferably 20° C. or more and further preferably 30° C. or more in view of reaction efficiency etc. In view of e.g., suppression of decomposition reaction and reduction in energy cost, the reaction temperature is preferably 200° C. or less, more preferably 150° C. or less and further preferably 100° C. or less.

The reaction time is preferably 0.5 hours or more and more preferably one hour or more in order to sufficiently conduct a reaction, and preferably 24 hours or less and more preferably 12 hours or less in view of e.g., efficiency of the production process.

If a solvent is used in the first step, a solvent having high affinity for a product, i.e., a short-chain linked cellulose derivative, can be used. As such a solvent, a solvent dissolving a general short-chain linked cellulose derivative having no crosslinking site can be used. Examples thereof include a hetero cyclic compound, an ether, an amide, a ketone, an ester, a polar halogenated hydrocarbon, a carbonate, a nitro compound, a nitrile and an organosulfur compound. Examples of the hetero cyclic compound include cyclic ethers (dioxane, tetrahydrofuran, dioxolane, etc.) and heteroarene (pyridine, quinoline, etc.). Examples of ether having high affinity include, other than the above cyclic ethers, non-cyclic ethers having a plurality of ether structures such as 1,2-dimethoxyethane and diethylene glycol dimethyl ether and ethers having an aryl group such as methylphenyl ether and diphenyl ether. Examples of the amides include N-methylpyrrolidone, N,N-dimethylformamide and N,N-dimethylacetamide. Examples of the ketone include acetone, methyl ethyl ketone, methyl isobutyl ketone and cyclohexanone. Examples of the ester include methyl formate, methyl acetate, ethyl acetate, butyl acetate and methyl cellosolve acetate. Examples of the polar halogenated hydrocarbon include chloroform, methylene chloride, dichloroethane, propylene chloride and tetrachloroethane. Examples of the carbonate include propylene carbonate and butylene carbonate. Examples of the nitro compound include nitromethane and nitropropane. Examples of the nitrile include acetonitrile and benzonitrile. Examples of the organosulfur compound include sulfoxide compounds such as dimethylsulfoxide. These solvents may be used as a mixture of two or more. Owing to the use of such a solvent, the cellulose derivative is likely to swell and furthermore, reactivity can be enhanced. Note that the product desirably has a crosslinking site so as not be dissolved in a liquid phase of a solid-liquid heterogeneous system in the second step later performed. The crosslinking site is preferably a part of crosslinking site that a cellulose had and remained. A crosslinking site may be further added by use of a crosslinking agent.

In the first step, a solvent hardly dissolving a general short-chain linked cellulose derivative having no crosslinking site can also be used. Owing to use of such a solvent, the amount of product dissolving in the solvent can be reduced and the yield in solid-liquid separation can be enhanced. In the recovery step, it is not necessary to precipitate and recover a product with the addition of a poor solvent and the recovery step can be simplified. Furthermore, energy required for the recovery step can be reduced. Moreover, crosslinking sites are sufficiently allowed to remain in a product. Examples of such a solvent having low solubility include aromatic hydrocarbons and substituted compounds thereof (benzene, toluene, xylene, etc.), alicyclic compounds (cyclohexane, etc.), non-cyclic ethers (diethylether, etc.) and a nonpolar halogenated hydrocarbons such as carbon tetrachloride.

Note that the "general short-chain linked cellulose derivative having no crosslinking site" refers to a short-chain linked cellulose derivative obtained by performing a reaction using a solvent capable of dissolving a product, adding a poor solvent to the resultant reaction solution to precipitate the product and performing solid-liquid separation.

If a catalyst is used in the first step, the catalyst can be appropriately selected depending upon the type of short-chain reactant and then put in use. If the short-chain reactant is, for example, a carboxylic acid and a carboxylic acid anhydride, an acid catalyst, a base catalyst and a metal-based catalyst can be used. Examples of the acid catalyst include inorganic acids (sulfuric acid, perchloric acid, hydrochloric acid, etc.) and organic acids (methane sulfonic acid, toluene sulfonic acid, etc.). Examples of the base catalyst include pyridine derivatives (dimethylaminopyridine (DMAP), 4-pyrrolidinopyridine, etc.), imidazoles (1-methylimidazole, 1,2-dimethylimidazole, etc.) and amidines (diazabicyclo undecene (DBU), diazabicyclononene, etc.). In view of reactivity, DMAP and DBU are preferable, and particularly DMAP is preferable. Examples of the metal-based catalyst include metal chlorides (iron chloride, aluminum chloride, indium chloride, basic zirconium chloride, zinc chloride, cobalt chloride, nickel chloride, copper chloride, etc.), metal nitrates (compounds obtained by substituting chloride ions of the aforementioned metal chlorides with nitric acid ions, etc.), metal sulfates (compounds obtained by substituting chloride ions of the aforementioned metal chlorides with sulfuric acid ions, etc.) and metal acetic acid salts (compounds obtained by substituting chloride ions of the aforementioned metal chlorides with acetic acid ions, etc.).

If a proton-affinity solvent capable of forming a hydrogen bond with a remaining hydroxy group of the cellulose derivative is used as the solvent, a base catalyst is preferable.

If the short-chain reactant is an isocyanate, an organic metal catalyst and a base catalyst can be used. Examples of the organic metal catalyst include tin octylate and dibutyltin dilaurate. Examples of the base catalyst include triethylene diamine and trimethyl aminoethyl piperazine.

[Introduction of Long-Chain Organic Group: Second Step of Two-Step Reaction Process (First Process)]

After the aforementioned step (first step) of introducing a short-chain organic group is performed, a step (the second step) of introducing a long-chain organic group into the short-chain linked cellulose derivative is sequentially performed.

In starting the reaction of the second step, the reaction solution used in the first step containing a short-chain reactant, a solvent and a catalyst may be partly or wholly removed in advance or allowed to remain as they are. If the reaction solution of the first step is removed before the second step, it is easy to set most suitable reaction conditions for the reaction of the second step. If the reaction solution of the first step is allowed to remain, a step of removing the reaction solution can be omitted, simplifying the entire process. If the second step is performed while the reaction solution of the first step is allowed to remain, a short-chain organic group introduction reaction can be performed simultaneously with a long-chain organic group introduction reaction.

In the second step, a long-chain reactant as mentioned above, and, if necessary, a solvent and a catalyst are mixed with a short-chain linked cellulose derivative, and the short-chain linked cellulose derivative and the long-chain reactant can be reacted in a solid-liquid heterogeneous system. At this time, if necessary, heating and stirring can be made.

In the second step, the short-chain linked cellulose derivative is soaked in a reaction solution containing a long-chain reactant to swell the short-chain linked cellulose derivative. The short-chain linked cellulose derivative in this state can be reacted. Owing to this, the long-chain reactant easily penetrates between molecular chains of the cellulose derivative, with the result that reactivity improves.

The use amount of reaction solution relative to the short-chain linked cellulose derivative in terms of mass can be set to be, for example, the same or more, preferably five times or more and more preferably 10 times or more. In view of e.g., load for removing the reaction solution after completion of the reaction and cost reduction of materials, the use amount is preferably 300 times or less, more preferably 100 times or less and further preferably 50 times or less.

The reaction temperature is preferably 10° C. or more, more preferably 20° C. or more and further preferably 30° C. or more in view of reaction efficiency etc. In view of e.g., suppression of decomposition reaction and reduction in energy cost, the reaction temperature is preferably 200° C. or less, more preferably 150° C. or less and further preferably 100° C. or less.

The reaction time is preferably 0.5 hours or more and more preferably one hour or more in order to sufficiently conduct a reaction, and preferably 24 hours or less and more preferably 12 hours or less in view of e.g., efficiency of the production process.

If a solvent is used in the second step, a solvent having high affinity for a starting substance of the reaction in the second step, i.e., a short-chain linked cellulose derivative, is preferably used, and a solvent dissolving a general short-chain linked cellulose derivative having no crosslinking site can be used. Such a solvent preferably has high affinity for the long-chain and short-chain linked cellulose derivative to be produced. Such a solvent can be appropriately selected depending upon the amount of remaining hydroxy group in a short-chain linked cellulose derivative, and the hydrophobicity and introduction amount of a short-chain organic group and a long-chain organic group. An aprotic solvent is preferable, and particularly, a proton-affinity solvent capable of forming a hydrogen bond with a hydroxy group of cellulose is preferable.

Examples of a solvent used in the second step include a hetero cyclic compound, an ether, an amide, a ketone, an ester, a polar halogenated hydrocarbon, a carbonate, a nitro compound, a nitrile and an organosulfur compound. Examples of the hetero cyclic compound include cyclic ethers (dioxane, tetrahydrofuran, dioxolane, etc.) and heteroarene (pyridine, quinoline, etc.). Examples of ether having high affinity include, other than the above cyclic ethers, non-cyclic ethers having a plurality of ether structures such as 1,2-dimethoxyethane and diethylene glycol dimethyl ether and ethers having an aryl group such as methylphenyl ether and diphenyl ether. Examples of the amides include N-methylpyrrolidone, N,N-dimethylformamide and N,N-dimethylacetamide. Examples of the ketone include acetone, methyl ethyl ketone, methyl isobutyl ketone and cyclohexanone. Examples of the ester include methyl formate, methyl acetate, ethyl acetate, butyl acetate and methyl cellosolve acetate. Examples of the polar halogenated hydrocarbon include chloroform, methylene chloride, dichloroethane, propylene chloride and tetrachloroethane. Examples of the carbonate include propylene carbonate and butylene carbonate. Examples of the nitro compound include nitromethane and nitropropane. Examples of the nitrile include acetonitrile and benzonitrile. Examples of the organosulfur compound include sulfoxide compounds such as dimethylsulfoxide. These solvents may be used as a mixture of two or more.

Owing to use of such a solvent as mentioned above, a satisfactory swollen state of the cellulose derivative is formed and the effect of steric hindrance is reduced and the reactivity of a long-chain reactant can be increased.

In the middle of a reaction, the same or different type of solvent may be appropriately added. For example, if the long-chain and short-chain linked cellulose derivative to be produced has a high degree of hydrophobicity than the short-chain linked cellulose derivative before the reaction, a solvent having a high degree of hydrophobicity is added in the middle of the reaction to enhance affinity for the solvent. In this manner, a satisfactory swollen state can be obtained to maintain or increase reactivity.

If a catalyst is used in the second step, the catalyst can be appropriately selected depending upon the type of long-chain reactant and then put in use. If the long-chain reactant is, for example, a carboxylic acid or a carboxylic acid anhydride, an acid catalyst, a base catalyst and a metal-based catalyst can be used. Examples of the acid catalyst include inorganic acids (sulfuric acid, perchloric acid, hydrochloric acid, etc.) and organic acids (methane sulfonic acid, toluene sulfonic acid, etc.). Examples of the base catalyst include pyridine derivatives (dimethylaminopyridine (DMAP), 4-pyrrolidinopyridine, etc.), imidazoles (1-methylimidazole, 1,2-dimethylimidazole, etc.) and amidines (diazabicyclo undecene (DBU), diazabicyclononene, etc.). In view of reactivity, DMAP and DBU are preferable, and particularly DMAP is preferable. Examples of the metal-based catalyst include metal chlorides (iron chloride, aluminum chloride, indium chloride, basic zirconium chloride, zinc chloride, cobalt chloride, nickel chloride, copper chloride, etc.), metal nitrates (compounds obtained by substituting chloride ions of the aforementioned metal chlorides with nitric acid ions, etc.), metal sulfates (compounds obtained by substituting chloride ions of the aforementioned metal chlorides with sulfuric acid ions, etc.) and metal acetic acid salts (compounds obtained by substituting chloride ions of the aforementioned metal chlorides with acetic acid ions, etc.).

If a proton-affinity solvent is used, a base catalyst is preferable.

If the long-chain reactant is isocyanate, an organic metal catalyst and a base catalyst can be used. Examples of the organic metal catalyst include tin octylate and dibutyltin dilaurate. Examples of the base catalyst include triethylenediamine and trimethyl aminoethyl piperazine.

[One-Stage Reaction (Second Process): Introduction of Long-Chain Organic Group or Long-Chain Organic Group and Short-Chain Organic Group]

To a cellulose or a cellulose to which the above activation treatment is applied, a long-chain organic group or a short-chain organic group and a long-chain organic group is(are) introduced. Note that a process for introducing a short-chain organic group and a long-chain organic group by using a short-chain reactant and a long-chain reactant will be described below; however, a cellulose derivative having a long-chain organic group introduced alone can be produced in the same manner as below except that a short-chain reactant is not used.

In this reaction step, a short-chain reactant as mentioned above and a long-chain reactant as mentioned above, and if necessary, a solvent and a catalyst are mixed with a cellulose. The cellulose, the short-chain reactant and the long-chain reactant can be reacted in a solid-liquid heterogeneous system. At this time, if necessary, heating and stirring can be performed. The types of the reactive functional groups of the short-chain reactant and long-chain reactant are preferably the same.

In the reaction step, a cellulose is soaked in the reaction solution containing a short-chain reactant and a long-chain reactant to swell the cellulose. The cellulose in this state can be reacted. Owing to this, the short-chain reactant and the long-chain reactant can easily penetrate between cellulose molecular chains, with the result that the reactivity improves.

The use amount of reaction solution relative to the cellulose in terms of mass can be set to be, for example, the same or more, preferably five times or more, and more preferably 10 times or more. In view of e.g., load for removing of the reaction solution after completion of the reaction and cost reduction of materials, the use amount is preferably 300 times or less, more preferably 100 times or less and further preferably 50 times or less.

The reaction temperature is preferably 10° C. or more, more preferably 20° C. or more and further preferably 30° C. or more in view of reaction efficiency etc. In view e.g., of suppression of decomposition reaction and reduction in energy cost, the reaction temperature is preferably 200° C. or less, more preferably 150° C. or less and further preferably 100° C. or less.

The reaction time is preferably 0.5 hours or more and more preferably one hour or more in order to sufficiently conduct a reaction, and preferably 24 hours or less and more preferably 12 hours or less in view of e.g., efficiency of the production process.

If a solvent is used, a solvent having high affinity for the long-chain and short-chain linked cellulose derivative (or long-chain linked cellulose derivative) to be produced, is preferably used. A solvent capable of dissolving a general short-chain linked cellulose derivative having no crosslinking site or a solvent capable of dissolving a general long-chain and short-chain linked cellulose derivative having no crosslinking site can be used. Such a solvent can be appropriately selected depending upon the amount of remaining hydroxy group in the cellulose derivative, and the degree of hydrophobicity and introduction amount of short-chain organic group and long-chain organic group. An aprotic solvent is preferable, and particularly, a proton-affinity solvent capable of forming a hydrogen bond with a hydroxy group of cellulose is preferable.

Examples of a solvent having high affinity as mentioned above include a hetero cyclic compound, an ether, an amide, a ketone, an ester, a polar halogenated hydrocarbon, a carbonate, a nitro compound, a nitrile and an organosulfur compound. Examples of the hetero cyclic compound include cyclic ethers (dioxane, tetrahydrofuran, dioxolane, etc.) and heteroarene (pyridine, quinoline, etc.). Examples of ether having high affinity include, other than the above cyclic ethers, non-cyclic ethers having a plurality of ether structures such as 1,2-dimethoxyethane and diethylene glycol dimethyl ether and ethers having an aryl group such as methylphenyl ether and diphenyl ether. Examples of the amides include N-methylpyrrolidone, N,N-dimethylformamide and N,N-dimethylacetamide. Examples of the ketone include acetone, methyl ethyl ketone, methyl isobutyl ketone and cyclohexanone. Examples of the ester include methyl formate, methyl acetate, ethyl acetate, butyl acetate and methyl cellosolve acetate. Examples of the polar halogenated hydrocarbon include chloroform, methylene chloride, dichloroethane, propylene chloride and tetrachloroethane. Examples of the carbonate include propylene carbonate and butylene carbonate. Examples of the nitro compound include nitromethane and nitropropane. Examples of the nitrile include acetonitrile and benzonitrile. Examples of the organosulfur compound include sulfoxide compounds such as dimethylsulfoxide. These solvents may be used as a mixture of two or more. Owing to use of a solvent as mentioned above, satisfactory swollen state of the cellulose derivative is formed and the effect of steric hindrance is reduced to improve reactivity of a reactant.

In the middle of the reaction, the same or different type of solvent may be appropriately added.

Note that the "general long-chain linked cellulose derivative having no crosslinking site" refers to a long-chain linked cellulose derivative obtained by performing a reaction using a solvent capable of dissolving a product, adding a poor solvent to the resultant reaction solution to precipitate the product and performing solid-liquid separation.

If a catalyst is used, the catalyst can be appropriately selected and used depending upon the type of short-chain reactant or long-chain reactant. If the reactant is, for example, a carboxylic acid and a carboxylic acid anhydride, an acid catalyst, a base catalyst and a metal-based catalyst can be used. Examples of the acid catalyst include inorganic acids (sulfuric acid, perchloric acid, hydrochloric acid, etc.) and organic acids (methane sulfonic acid, toluene sulfonic acid, etc.). Examples of the base catalyst include pyridine derivatives (dimethylaminopyridine (DMAP), 4-pyrrolidinopyridine, etc.), imidazoles (1-methylimidazole, 1,2-dimethylimidazole, etc.) and amidines (diazabicyclo undecene (DBU), diazabicyclononene, etc.). In view of reactivity, DMAP and DBU are preferable, and particularly DMAP is preferable. Examples of the metal-based catalyst include metal chlorides (iron chloride, aluminum chloride, indium chloride, basic zirconium chloride, zinc chloride, cobalt chloride, nickel chloride, copper chloride, etc.), metal nitrates (compounds obtained by substituting chloride ions of the aforementioned metal chlorides with nitric acid ions, etc.), metal sulfates (compounds obtained by substituting chloride ions of the aforementioned metal chlorides with sulfuric acid ions, etc.) and metal acetic acid salts (compounds obtained by substituting chloride ions of the aforementioned metal chlorides with acetic acid ions, etc.).

If a proton-affinity solvent is used, a base catalyst is preferable.

If a reactant is isocyanate, an organic metal catalyst and a base catalyst can be used. Examples of the organic metal catalyst include tin octylate and dibutyl tin dilaurate. Examples of the base catalyst include triethylenediamine and trimethylaminoethyl piperazine.

[Dissociation of Crosslinking Site]

After an organic group is introduced, the crosslinking site of a cellulose derivative, if necessary, can be dissociated. If the proportion of the crosslinking sites relative to the entire structure of cellulose derivative is small, the cellulose derivative can be used as it is as a resin without a dissociation treatment of the crosslinking sites. If the proportion of the crosslinking sites is large, thermoplasticity sometimes reduces and thus, if necessary, a dissociation treatment of crosslinking sites may be performed.

Dissociation of crosslinking sites is preferably performed after introduction of a long-chain organic group and the recovery step of a product (solid-liquid separation) described later.

A method for dissociating crosslinking sites, heating, addition of a plasticizer, addition of a solvent, addition of a reactive organic substance or inorganic substance for reacting with the linking sites and dissociating the sites, irradiation with an electromagnetic wave such as a UV ray, an electron beam and a neutron beam, are mentioned. Heating or addition of a plasticizer may be performed at the time of melting and kneading a product. As the plasticizer, various types of additives described later can be used. If crosslinking is due to a hydrogen bond formed with hydroxy groups in a cellulose derivative, a method of dissociating a hydrogen bond is effective; for example, a substance capable of dissociating a hydrogen bond can be added. As the substance capable of dissociating a hydrogen bond, for example, a substance reacting with a hydroxy group to eliminate the hydroxy group (for example, substituting the hydrogen atom of a hydroxy group or converting the hydroxy group to another functional group) is mentioned. Alternatively, a plasticizer and an ion liquid are mentioned. As the substance to be reacted with a hydroxy group, a short-chain reactant and long-chain reactant as mentioned above can be used.

[Recovery of Product: Solid-Liquid Separation]

A product, i.e., a long-chain and short-chain linked cellulose derivative (or long-chain linked cellulose derivative), if it has a crosslinking site, tends to have low solubility to a reaction solution. Thus, the product can be easily recovered by a general solid-liquid separation treatment. Examples of the solid-liquid separation include filtration (natural filtration, filtration under reduced pressure, pressure filtration, centrifugal filtration and hot filtration), spontaneous precipitation/levitation, liquid separation, centrifugation and compression. These may be used in appropriate combination. In a production process according to an exemplary embodiment, a step of precipitating and recovering a product dissolved in a reaction solution with a large amount of poor solvent can be omitted. Thus, the production process has low energy load in the recovery step compared to a production process of the related art requiring such precipitation and recovery.

The solid content obtained by the solid-liquid separation is, if necessary, washed and dried by a general method.

[Physical Properties of Product (Organic Group-Introduced Cellulose Derivative)]

The cellulose derivative obtained by a production process according to an exemplary embodiment of the present invention is reduced in intermolecular force (crosslinking sites) compared to a cellulose since an organic group (a short-chain organic group and long-chain organic group, or a long-chain organic group) is introduced by use of a hydroxy group of a cellulose. In addition, since the long-chain organic group introduced serves as an internal plasticizer, such an organic group-introduced cellulose derivative can exhibit satisfactory thermoplasticity. If a long-chain organic group having high hydrophobicity is used, water resistance can be further enhanced.

In a production process according to an exemplary embodiment of the present invention, the organic group-introduced cellulose derivative can be obtained having appropriate crosslinking sites. Thus, elastic modulus of the cellulose derivative is high compared to cellulose derivatives which have no crosslinking sites. Note that if the introduction amount of a long-chain organic group and the amount of crosslinking are controlled, a desired elastic modulus can be obtained including a low elastic modulus.

[Molding Resin Composition and Additive]

The organic group-introduced cellulose derivative of the exemplary embodiment of the present invention can provide a resin composition suitable as a molding material by adding additives in accordance with desired properties.

To the cellulose derivative of the present invention, various types of additives usually used in thermoplastic resins can be applied. For example, if a plasticizer is added, thermoplasticity and breaking elongation breaking can be more improved. Examples of such a plasticizer include phthalic esters such as dibutyl phthalate, diaryl phthalate, diethyl phthalate, dimethyl phthalate, di-2-methoxyethyl phthalate, ethyl phthalyl ethyl glycolate and methyl phthalyl ethyl glycolate; tartaric acid esters such as dibutyl tartrate; adipic acid esters such as dioctyl adipate and diisononyl adipate; polyhydric alcohol esters such as triacetin, diacetyl glycerin, tripropionitrile glycerin and glyceryl monostearate; phosphoric acid esters such as triethyl phosphate, triphenyl phosphate and tricresyl phosphate; dibasic fatty acid esters such as dibutyl adipate, dioctyl adipate, dibutyl azelate, dioctyl azelate and dioctyl sebacate; citric acid esters such as triethyl citrate, acetyltriethyl citrate and tributyl acetylcitrate; epoxylated vegetable oils such as epoxylated soybean oil and epoxylated linseed oil; castor oil and a derivative thereof; benzoic acid esters such as ethyl O-benzoyl benzoate; aliphatic dicarboxylic acid esters such as sebacate and azelate; unsaturated dicarboxylic acid esters such as maleate; and N-ethyl toluene sulfonamide, triacetin, O-cresyl p-toluenesulfonate and tripropionin Particularly of them, if a plasticizer such as dioctyl adipate, benzyl adipate-2 butoxyethoxyethyl, tricresyl phosphate, diphenylcresyl phosphate or diphenyl octyl phosphate is added, not only thermoplasticity and elongation at breakage but also shock resistance can be effectively improved.

Examples of other plasticizers include cyclohexane dicarboxylic acid esters such as dihexyl cyclohexanedicarboxylate, dioctyl cyclohexanedicarboxylate and di-2-methyloctyl cyclohexanedicarboxylate; trimellitic acid esters such as dihexyl trimellitate, diethylhexyl trimellitate and dioctyl trimellitate; and pyromellitic acid esters such as dihexyl pyromellitate, diethylhexyl pyromellitate and dioctyl pyromellitate.

To the cellulose derivative produced in the exemplary embodiment, if necessary, an inorganic or organic granular or fibrous filler can be added. By adding a filler, strength and rigidity can be more improved. Examples of the filler include, mineral particles (talc, mica, baked siliceous earth, kaolin, sericite, bentonite, smectite, clay, silica, quartz powder, glass beads, glass powder, glass flake, milled fiber, Wollastonite, etc.), boron-containing compounds (boron nitride, boron carbonate, titanium boride etc.), metal carbonates (magnesium carbonate, heavy calcium carbonate, light calcium carbonate, etc.), metal silicates (calcium silicate, aluminum silicate, magnesium silicate, magnesium aluminosilicate, etc.), metal oxides (magnesium oxide etc.), metal hydroxides (aluminum hydroxide, calcium hydroxide, magnesium hydroxide, etc.), metal sulfates (calcium sulfate, barium sulfate, etc.), metal carbides (silicon carbide, aluminum carbide, titanium carbide, etc.), metal nitrides (aluminum nitride, silicon nitride, titanium nitride, etc.), white carbon and metal foils. Examples of the fibrous filler include organic fibers (natural fiber, papers etc.), inorganic fibers (glass fiber, asbestos fiber, carbon fiber, silica fiber, silica alumina fiber, Wollastonite, zirconia fiber, potassium titanate fiber etc.) and metal fibers. These fillers can be used singly or in combination of two or more types.

To the cellulose derivative produced in the exemplary embodiment, if necessary, a flame retardant can be added. By adding a flame retardant, flame resistance can be imparted. Examples of the flame retardant include metal hydrates such as magnesium hydroxide, aluminum hydroxide and hydrotalcite, basic magnesium carbonate, calcium carbonate, silica, alumina, talc, clay, zeolite, bromine-based flame retardant, antimony trioxide, phosphoric acid based flame retardant (aromatic phosphate, aromatic condensed phosphate, etc.), compounds containing phosphorus and nitrogen (phosphazene compound), etc. These flame retardants can be used singly or in combination with two or more types.

To the cellulose derivative produced in the exemplary embodiment, if necessary, a shock resistance improver can be added. By adding a shock resistance improver, shock resistance can be improved. Examples of the shock resistance improver include a rubber component and a silicone compound. Examples of the rubber component include a natural rubber, epoxylated natural rubber and synthesized rubber. Furthermore, examples of the silicone compound include organic polysiloxane formed by polymerization of alkyl siloxane, alkyl phenyl siloxane, etc. and modified silicone compounds obtained by modifying a side chain or an end of an organic polysiloxane as mentioned above with polyether, methylstyryl, alkyl, higher fatty acid ester, alkoxy, fluorine, an amino group, an epoxy group, a carboxyl group, a carbinol group, a methacryl group, a mercapto group, a phenol group etc. These shock resistance improvers can be used singly or in combination of two or more types.

As the silicone compound, a modified silicone compound (modified polysiloxane compound) is preferred. As the modified silicone compound, a modified polydimethyl siloxane is preferred, which has a structure having a main chain constituted of dimethyl siloxane repeat units and a side chain or a terminal methyl group partly substituted with an organic substituent containing at least one group selected from an amino group, an epoxy group, a carbinol group, a phenol group, a mercapto group, a carboxyl group, a methacryl group, a long-chain alkyl group, an aralkyl group, a phenyl group, a phenoxy group, an alkyl phenoxy group, a long-chain fatty acid ester group, a long-chain fatty acid amide group and a polyether group. The modified silicone compound, because of the presence of such an organic substituent, is improved in affinity for the aforementioned cellulose derivative and dispersibility in the cellulose derivative is improved. Consequently, a resin composition excellent in shock resistance can be obtained.

As such a modified silicone compound, a modified silicone compound produced in accordance with a conventional method can be used.

Examples of the organic substituent contained in the modified silicone compound include the organic substituents represented by the following formulas (2) to (20):

[Formula 2]

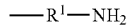     (2)

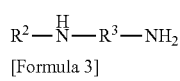     (3)

[Formula 3]

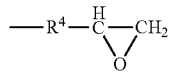     (4)

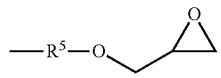     (5)

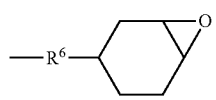     (6)

[Formula 4]

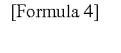     (7)

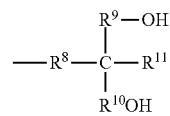     (8)

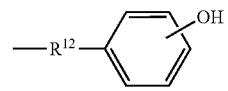     (9)

—R$^{13}$•SH     (10)

[Formula 5]

—R$^{14}$COOH     (11)

[Formula 6]

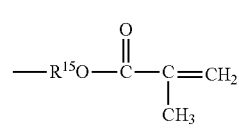     (12)

[Formula 7]

—R$^{16}$     (13)

[Formula 8]

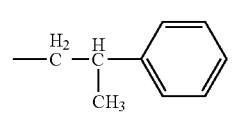     (14)

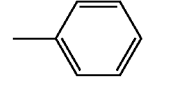     (15)

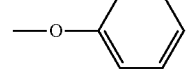     (16)

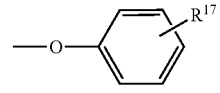     (17)

[Formula 9]

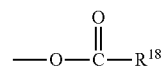     (18)

[Formula 10]

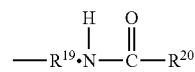     (19)

[Formula 11]

—R$^{21}$(C$_2$H$_4$O)$_a$[CH$_2$CH(CH$_3$)O]$_b$R$^{22}$     (20)

where a and b each represent an integer of 1 to 50.

In the aforementioned formulas, R$^1$ to R$^{10}$, R$^{12}$ to R$^{15}$, R$^{19}$ and R$^{21}$ each represent a divalent organic group. Examples of the divalent organic group include alkylene groups such as a methylene group, an ethylene group, a propylene group and a butylene group; alkyl arylene groups such as a phenylene group and a tolylene group; oxyalkylene groups and polyoxyalkylene groups such as —(CH$_2$—CH$_2$—O)c- (c represents an integer from 1 to 50), —[CH$_2$—CH(CH$_3$)—O]d- (d represents an integer from 1 to 50), and —(CH$_2$)e-NHCO— (e represents an integer from 1 to 8). Of these, an alkylene group is preferable and particularly, an ethylene group and a propylene group are preferable.

In the aforementioned formulas, $R^{11}$, $R^{16}$ to $R^{18}$, $R^{20}$ and $R^{22}$ each represent an alkyl group having at most 20 carbon atoms. Examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group and a pentadecyl group. Furthermore, the structures of the above alkyl groups may have one or more unsaturated bonds.

The total average content of organic substituents in a modified silicone compound desirably falls within the range where the modified silicone compound having an appropriate particle diameter (for example, 0.1 μm or more and 100 μm or less) can be dispersed in a matrix, i.e., a cellulose derivative, during a process for producing a cellulose derivative composition. If a modified silicone compound having an appropriate particle diameter is dispersed in a cellulose derivative, stress concentration on the periphery of a silicone region having a low elastic modulus effectively occurs. As a result, a resin molded body having excellent shock resistance can be obtained. The total average content of such organic substituents is preferably 0.01% by mass or more and more preferably 0.1% by mass or more, and also preferably 70% by mass or less and more preferably 50% by mass or less. If an organic substituent is contained appropriately, the modified silicone compound can be improved in affinity for a cellulose resin, the modified silicone compound having an appropriate particle diameter can be dispersed in a cellulose derivative, and further bleed out due to separation of the modified silicone compound in a molding can be suppressed. If the total average content of the organic substituents is excessively low, it becomes difficult to disperse a modified silicone compound having an appropriate particle diameter in a cardanol-added cellulose resin.

If an organic substituent of the modified polydimethyl siloxane compound is an amino group, an epoxy group, a carbinol group, a phenol group, a mercapto group, a carboxyl group or a methacryl group, the average content of the organic substituent in the modified polydimethyl siloxane compound can be obtained by the following Expression (I).

$$\text{Organic substituent average content (\%)} = (\text{organic substituent formula-weight/organic substituent equivalent}) \times 100 \quad (I)$$

In the Expression (I), the organic substituent equivalent is an average mass of a modified silicone compound per organic substituent (1 mole).

When the organic substituent of the modified polydimethyl siloxane compound is a phenoxy group, an alkylphenoxy group, a long-chain alkyl group, an aralkyl group, a long-chain fatty acid ester group or a long-chain fatty acid amide group, the average content of the organic substituent of the modified polydimethyl siloxane compound can be obtained from the following Expression (II).

$$\text{Organic substituent average content (\%)} = x \times w/[(1-x) \times 74 + x \times (59+w)] \times 100 \quad (II)$$

In the Expression (II), x is an average molar fraction of the organic substituent-containing a siloxane repeat unit relative to all siloxane repeat units of the modified polydimethyl siloxane compound; and w is the formula weight of the organic substituent.

In the case where the organic substituent of the modified polydimethyl siloxane compound is a phenyl group, the average content of the phenyl group in the modified polydimethyl siloxane compound can be obtained by the following Expression (III).

$$\text{Phenyl group average content (\%)} = 154 \times x/[74 \times (1-x) + 198 \times x] \times 100 \quad (III)$$

In the Expression (III), x is an average molar fraction of the phenyl group-containing siloxane repeat unit relative to all siloxane repeat units in the modified polydimethyl siloxane compound (A).

In the case where the organic substituent of the modified polydimethyl siloxane compound is a polyether group, the average content of the polyether group in the modified polydimethyl siloxane compound can be obtained by the following Expression (IV).

$$\text{Polyether group average content (\%)} = HLB \text{ value}/20 \times 100 \quad (IV)$$

In the Expression (IV), the HLB value represents the degree of affinity of a surfactant for water and oil, and is defined by the following Expression (V) based on the Griffin Act.

$$HLB \text{ value} = 20 \times (\text{sum of formula weights of hydrophilic moieties/molecular weight}) \quad (V)$$

To the cellulose derivative of the exemplary embodiment, two or more modified silicone compounds having different affinities to the derivative may be added. In this case, dispersibility of a relative low-affinity modified silicone compound (A1) is improved by a relative high-affinity modified silicone compound (A2) to obtain a cellulose resin composition having even more excellent shock resistance. The total average content of an organic substituent of the relatively low-affinity modified silicone compound (A1) is preferably 0.01% by mass or more and more preferably 0.1% by mass or more and also preferably 15% by mass or less and more preferably 10% by mass or less. The total average content of an organic substituent of the relatively high-affinity modified silicone compound (A2) is preferably 15% by mass or more and more preferably 20% by mass or more and also preferably 90% by mass or less.

The blending ratio (mass ratio) of the modified silicone compound (A1) to the modified silicone compound (A2) can be set to fall within the range of 10/90 to 90/10.

In a modified silicone compound, dimethyl siloxane repeat units and organic substituent-containing siloxane repeat units each of which may be homologously and continuously connected, alternately connected or connected at random. A modified silicone compound may have a branched structure.

The number average molecular weight of a modified silicone compound is preferably 900 or more and more preferably 1000 or more, and also preferably 1000000 or less, more preferably 300000 or less and further preferably 100000 or less. If the molecular weight of a modified silicone compound is sufficiently large, loss by vaporization can be suppressed in kneading with a melted cellulose derivative during a process for producing a cellulose derivative composition. Furthermore, if the molecular weight of a modified silicone compound is appropriate (not excessively large), a uniform molding having good dispersibility can be obtained.

As the number average molecular weight, a value (calibrated by a polystyrene standard sample) obtained by measuring a 0.1% chloroform solution of a sample by GPC can be employed.

The addition amount of such a modified silicone compound is preferably, in view of obtaining sufficient addition effect, 1% by mass or more relative to the total cellulose derivative composition and more preferably 2% by mass or more. In view of sufficiently ensuring properties of a cellulose resin such as strength and suppressing bleed out, the addition amount of a modified silicone compound is preferably 20% by mass or less and more preferably 10% by mass or less.

By adding such a modified silicone compound to a cellulose derivative, the modified silicone compound having an appropriate particle diameter (for example, 0.1 to 100 μm) can be dispersed in the resin and the shock resistance of a resin composition can be improved.

To the cellulose derivative of the exemplary embodiment, if necessary, additives such as a colorant, an antioxidant and a heat stabilizer may be added as long as they are applied to conventional resin compositions.

To the cellulose derivative of the exemplary embodiment, if necessary, a general thermoplastic resin may be added.

Particularly, by adding a thermoplastic resin having excellent flexibility such as a thermoplastic polyurethane elastomer (TPU), shock resistance can be improved. The addition amount of such a thermoplastic resin (particularly, TPU) is, in view of obtaining sufficient addition effect, preferably 1% by mass or more and more preferably 5% by mass or more relative to the total composition containing the cellulose resin of the exemplary embodiment. In view of ensuring the properties of a cellulose resin such as strength and suppressing bleed out, the addition amount of thermoplastic resin is preferably 20% by mass or less and more preferably 15% by mass or more.

The thermoplastic polyurethane elastomer (TPU) suitable for improving shock resistance that can be used includes a polyurethane elastomer prepared by using a polyol, a diisocyanate and a chain extender.

Examples of the polyol include polyester polyol, polyester ether polyol, polycarbonate polyol and polyether polyol.

Examples of the polyester polyol include a polyester polyol obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a polyol such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,3-octane diol, 1,9-nonane diol, or a mixture of these; and a polylactone diol obtained by ring-opening polymerization of a lactone monomer such as ε-caprolactone.

Examples of the polyester ether polyol include a compound obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a glycol such as diethylene glycol or an alkylene oxide adduct (propylene oxide adduct etc.) or a mixture of these.

Examples of the polycarbonate polyol include a polycarbonate polyol obtained by reacting one or two or more polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol and diethylene glycol with diethylene carbonate, dimethyl carbonate, diethyl carbonate, etc.; and further may include a copolymer of a polycaprolactone polyol (PCL) and a polyhexamethylene carbonate (PHL).

Examples of the polyether polyol include a polyethylene glycol, polypropylene glycol and polytetramethylene ether glycol, each of which is obtained by polymerizing respective cyclic ethers: ethylene oxide, propylene oxide and tetrahydrofuran; and copolyethers of these.

Examples of the diisocyanate to be used in formation of TPU include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexyl methane diisocyanate (hydrogenated MDI; HMDI). Of these, 4,4'-diphenylmethane diisocyanate (MDI) and 1,6-hexamethylene diisocyanate (HDI) are preferably used.

Examples of the chain extender to be used in formation of TPU, a low-molecular weight polyol can be used. Examples of the low-molecular weight polyol include aliphatic polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol, diethylene glycol and 1,4-cyclohexane dimethanol and glycerin; and aromatic glycols such as 1,4-dimethylolbenzene, bisphenol A and ethylene oxide or a propylene oxide adduct of bisphenol A.

When a silicone compound is copolymerized with a thermoplastic polyurethane elastomer (TPU) obtained from these materials, further excellent shock resistance can be obtained.

These thermoplastic polyurethane elastomers (TPU) may be used singly or in combination.

A method for producing a resin composition containing the cellulose derivative of the exemplary embodiment, additives and a thermoplastic resin, is not particularly limited. For example, the resin composition can be produced by melting and mixing additives and the cellulose resin manually by handmixing or by use of a known mixer such as a tumbler mixer, a ribbon blender, a single-axial or a multiaxial mixing extruder, and a compounding apparatus such as a kneader and kneading roll and, if necessary, granulating the mixture into an appropriate shape. In another preferable process, additives dispersed in solvent such as an organic solvent and a resin are mixed and furthermore, if necessary, a coagulation solvent is added to obtain a mixed composition of the additives and the resin and thereafter, the solvent is evaporated.

The cellulose derivative according to the exemplary embodiments mentioned above can be used as a base resin for a molding material (resin composition). The molding material using the cellulose derivative as a base resin is suitable for forming a molded body such as housing, e.g. packaging for an electronic device.

The base resin herein refers to a main component of the molding material and means that other components may be contained as long as the components do not prevent the function of the main component. The content rate of the main component is not particularly limited; however, the content rate of the main component in a composition is 50% by mass or more, preferably 70% by mass or more, more preferably 80% by mass or more and particularly preferably 90% by mass or more.

EXAMPLES

The present invention will be more specifically described by way of examples below.

Examples and Comparative Examples of the First Process (Two-Stage Reaction Process)

Synthesis Example 1

Synthesis of Cellulose Acetate (First Step of Two-Stage Reaction Process)

After an activation treatment of a cellulose, the cellulose was reacted with acetic anhydride in a solid-liquid heterogeneous system to obtain cellulose acetate. At this time, toluene, which is a poor solvent for cellulose acetate, was used as a solvent to allow the product to place in an insoluble state. In this manner, the product was recovered by solid-liquid separation.

First, an activation treatment of the cellulose was performed in accordance with the following method.

A cellulose (product name: KC flock, brand: W-50GK, manufactured by NIPPON PAPER INDUSTRIES Co., Ltd.) (10.0 g) (mass excluding adsorption water) was dispersed in 150 mL of pure water. The dispersion solution was stirred for 15 minutes and subjected to suction filtration for 5 minutes to remove pure water. The resultant solid content was dispersed in 150 mL of acetic acid, stirred for 15 minutes and subjected to suction filtration for 5 minutes to remove acetic acid. The dispersion in acetic acid and removal of acetic acid were repeated twice. In this manner, activated cellulose was obtained.

Next, cellulose acetate was synthesized by the following method.

To the cellulose activated in the above, a solution mixture of toluene (150 mL), acetic acid (80 mL) and perchloric acid (80 μL) was added. Thereafter, acetic anhydride (50 mL) was added to the mixture and stirred. Thirteen minutes after addition of acetic anhydride, the reaction mixture was separated by suction filtration. The resultant solid content was washed twice with methanol (150 mL) and further washed three times with water (150 mL). Thereafter, the solid content was dispersed in pure water (300 mL) and the remaining acid was neutralized with sodium carbonate. Finally, the solid content neutralized was further washed twice with pure water (150 mL) and dried to obtain a product, i.e., cellulose acetate.

$DS_{Ace}$ (substitution degree with acetyl group) of cellulose acetate was evaluated by the neutralization titration shown below. The cellulose acetate (0.30 g) obtained above was dispersed in dimethylsulfoxide (25 mL) and heated at 90° C. for 30 minutes with stirring. Thereafter, the dispersion solution was cooled to room temperature. A potassium hydroxide-ethanol solution (25 mL (0.5 N)) was added to the dispersion solution and the resultant solution was heated at 90° C. for 60 minutes with stirring. By the treatment, the cellulose acetate is hydrolyzed and acetic acid is liberated. Thereafter, the solution was cooled room temperature and hydrochloric acid (25 mL (0.5 N)) was added. The resultant mixture was stirred for 30 minutes. Finally, neutralization titration was performed with an aqueous sodium hydroxide solution (0.1 N) to obtain the amount of acetic acid liberated. In the neutralization titration mentioned above, $DS_{Ace}$ was obtained as 2.3.

Synthesis Example 2

Synthesis of Raw Material of Long-Chain Reactant (Carboxylated Hydrogenated Cardanol)

Hydrogenated cardanol (m-n-pentadecylphenol manufactured by ACROS Organics) prepared by hydrogenating an unsaturated bond of the straight-chain hydrocarbon moiety of the cardanol was used as a raw material. The phenolic hydroxy group of the hydrogenated cardanol was reacted with monochloro acetic acid to add a carboxyl group. In this manner, carboxylated hydrogenated cardanol was obtained. More specifically, carboxylated hydrogenated cardanol was prepared in accordance with the following procedure.

First, hydrogenated cardanol (80 g (0.26 mol)) was dissolved in methanol (120 mL). To this, an aqueous solution of sodium hydroxide (64 g (1.6 mol)) dissolved in distilled water (40 mL) was added. Thereafter, a solution of monochloro acetic acid (66 g (0.70 mol), manufactured by Kanto Chemical Co., Inc.) dissolved in methanol (50 mL) was added dropwise at room temperature. After completion of dropwise addition, the reaction solution was refluxed at 73° C. for 4 hours while stirring. After the reaction solution was cooled to room temperature, the reaction solution was acidified with a diluted hydrochloric acid until pH reached 1. To this, methanol (250 mL) and diethylether (500 mL) were added and further distilled water (200 mL) was added. The water layer was separated by a separation funnel and discarded. The ether layer was washed twice with distilled water (400 mL). To the ether layer, anhydrous magnesium was added, dried, and separated by filtration. The filtrate (ether layer) was concentrated under vacuum by an evaporator (90° C./3 mmHg) to obtain a yellow-brown powdery crude product as a solid content. The crude product was recrystallized from n-hexane and dried under vacuum to obtain a white powder of carboxylated hydrogenated cardanol (46 g (0.12 mol)).

Synthesis Example 3

Synthesis of Long-Chain Reactant (Acid Anhydride-Modified Hydrogenated Cardanol)

The carboxylated hydrogenated cardanol of Synthesis Example 2 was dehydrated by acetic anhydride to obtain acid anhydride-modified hydrogenated cardanol. More specifically, acid anhydride-modified hydrogenated cardanol was prepared in accordance with the following procedure.

The carboxylated hydrogenated cardanol (17.2 g) of Synthesis Example 2 was dissolved in acetic anhydride (114 mL) while heating and stirred at 123° C. for one hour. Thereafter, the temperature of the reaction mixture was raised while distilling away acetic anhydride under reduced pressure. The reaction mixture was stirred while heating at 140° C., 7 Torr (933 Pa) for 2 hours. A product of acid anhydride-modified hydrogenated cardanol was obtained as the remaining component without being distilled away.

The purity of the obtained acid anhydride-modified hydrogenated cardanol was determined by liquid chromatography (product name: LC-10ADVP, manufactured by Shimadzu Corporation). As a result, the purity was 90% by mass.

Note that the obtained long-chain reactant (acid anhydride-modified hydrogenated cardanol) has 46 carbon atoms. The long-chain organic group (carboxylated hydrogenated cardanol bound to a hydroxy group of a cellulose via an ester bond) produced in Example (described later) has 23 carbon atoms.

Synthesis Example 4

Synthesis of Long-Chain Reactant (Acid Chloride Modified Hydrogenated Cardanol)

The carboxylated hydrogenated cardanol synthesized in Synthesis Example 2 was chlorinated with oxalyl chloride to convert a carboxyl group into an acid chloride group to obtain acid chlorinated hydrogenated cardanol. More specifically, the acid chlorinated hydrogenated cardanol was prepared in accordance with the following procedure.

The carboxylated hydrogenated cardanol (46 g (0.12 mol)) of Synthesis Example 2 was dissolved in dehydrated chloroform (250 mL) and oxalyl chloride (24 g (0.19 mol)) and N,N-dimethylformamide (0.25 mL (3.2 mmol)) were added. The mixture was stirred for 72 hours at room temperature. Chloroform, excessive oxalyl chloride and N,N-dimethylformamide were distillated away under reduced pressure to obtain acid chlorinated and hydrogenated cardanol (48 g (0.13 mol)).

Note that the obtained long-chain reactant (acid chloride modified cardanol) has 23 carbon atoms. The long-chain organic group (carboxylated hydrogenated cardanol bound to a hydroxy group of a cellulose via an ester bond) to be produced in Comparative Example (described later) has 23 carbon atoms.

Example 1

As described in Synthesis Example 1, a cellulose was acetylated in a solid-liquid heterogeneous system to a obtain cellulose acetate (short-chain linked cellulose derivative) (the first step). Subsequently, the acid anhydride-modified hydrogenated cardanol of Synthesis Example 3 was reacted with the cellulose acetate of Synthesis Example 1 in a solid-liquid heterogeneous system to obtain a long-chain and short-chain linked cellulose derivative (the second step). More specifically, the long-chain and short-chain linked cellulose derivative was prepared in accordance with the following procedure.

The cellulose acetate (1.50 g ($DS_{Ace}$=2.3, amount of hydroxy group: 4 mmol)) of Synthesis Example 1 was dried and dispersed in dehydrated dioxane (20 mL). To the dispersion solution, a dioxane solution of dimethylaminopyridine (DMAP)(185 mg (1.5 mmol)) dissolved in dehydrated dioxane (5 mL) was added and further a dioxane solution of acid anhydride-modified hydrogenated cardanol (9.7 g (12 mmol)) of Synthesis Example 3 dissolved in dehydrated dioxane (20 mL) was added.

After the resultant solution was stirred while heating at 90° C. for 5 hours, 25 ml of the suspension solution was taken from the solution and separated by vacuum filtration.

After the separation with filtration, the cellulose derivative was obtained. Of them, the solid content obtained as the residue of the separation with filtration and the soluble matter dissolved in the filtrate were quantitatively determined. The mass ratio (solid content recovery rate) of the solid content recovered by the separation with filtration was evaluated. The solid content obtained by separation with filtration was washed and dried to obtain a product (956 mg). Washing was repeatedly performed so as not to leave an unreacted substance in consideration of analysis. Specifically, washing with dioxane (50 mL) was repeated four times and washing with diethylether (50 mL) was performed once. The solvent of the filtrate was removed by heating under vacuum and remaining soluble matter was evaluated by liquid chromatography (product name: LC-10ADVP manufactured by Shimadzu Corporation). The cellulose derivative dissolved in the filtrate was estimated as 30 mg. From the above, the solid content recovery rate was 97%.

The substitution degree with the long-chain organic group ($DS_{LO}$) of the obtained solid content (a long-chain and short-chain linked cellulose derivative) was determined by IR (infrared spectroscopy). As a result, $DS_{LO}$ was 0.7.

The substitution degree $DS_{LO}$ was determined by IR measurement based on the intensity of stretching and shrinking peak (1586 cm$^{-1}$) derived from a benzene ring skeleton. The intensity of the peak was normalized based on the stretching and shrinking peak of the ether bond of a glucopyranose ring. The relationship between substitution degree and peak intensity was corrected based on a sample having a known substitution degree (sample synthesized by a homogeneous reaction: the substitution degree can be evaluated by NMR).

The process chart of the Example is shown in FIG. 1.

Example 2

Cellulose acetate (short-chain linked cellulose derivative) was obtained (first step) by acetylating a cellulose in a solid-liquid heterogeneous system in the same manner as in Synthesis Example 1.

Subsequently, with the cellulose acetate of Synthesis Example 1 the acid anhydride-modified hydrogenated cardanol of Synthesis Example 3 was reacted in a solid-liquid heterogeneous system to obtain a long-chain and short-chain linked cellulose derivative (second step). The second step was carried out in the same manner as Example 1 except that the reaction temperature was set at 100° C. and pyridine was employed as a solvent in place of dioxane.

The solid content recovery rate was evaluated in the same manner as in Example 1. It was 98%.

The substitution degree with a long-chain organic group ($DS_{LO}$) of the obtained solid content (a long-chain and short-chain linked cellulose derivative) was determined by IR. $DS_{LO}$ was 0.5.

The process chart of the Example is shown in FIG. 1.

Example 3

Cellulose acetate (short-chain linked cellulose derivative) was obtained (first step) by acetylating a cellulose in a solid-liquid heterogeneous system in the same manner as in Synthesis Example 1.

Subsequently, with the cellulose acetate of Synthesis Example 1, the acid anhydride-modified hydrogenated cardanol of Synthesis Example 3 was reacted in a solid-liquid heterogeneous system to obtain a long-chain and short-chain linked cellulose derivative (second step). The second step was performed in the same manner as Example 2 except that diazabicycloundecene (DBU) was employed as a catalyst in place of DMAP.

The solid content recovery rate was evaluated in the same manner as in Example 1. It was 96%.

The substitution degree with a long-chain organic group ($DS_{LO}$) of the obtained solid content (a long-chain and short-chain linked cellulose derivative) was determined by IR. $DS_{LO}$ was 0.4.

The process chart of the Example is shown in FIG. 1.

Comparative Example 1

Acid chlorinated hydrogenated cardanol of Synthesis Example 4 and a cellulose acetate (trade name: LM-80, manufactured by Daicel Chemical Industries, Ltd., the number of acetic acid groups added per a single glucose unit of cellulose (degree of substitution by acetylation: $DS_{Ace}$)=2.1) were reacted in the state of a solution and the reaction solution was added to a poor solvent to precipitate a product. In this manner, a long-chain and short-chain linked cellulose derivative was obtained. More specifically, the long-chain and short-chain linked cellulose derivative was prepared in accordance with the following procedure.

Cellulose acetate (10 g)(amount of hydroxy group: 0.036 mol) was dissolved in 200 mL of dehydrated dioxane and a reaction catalyst and triethylamine 5.0 mL (0.036 mol) as an acid-trapping agent were added. To this solution, a dioxane solution (100 mL) dissolving acid-chlorinated hydrogenated cardanol (23 g (0.054 mol)) of Synthesis Example 4 was added and stirred while heating at 100° C. for 5 hours. The reaction solution was slowly added dropwise to methanol (3 L) while stirring to reprecipitate a solid substance. The resultant solid substance was separated by filtration. The solid content (obtained by separation with filtration) was dried overnight in the air and further dried in vacuum at 105° C. for 5 hours to obtain a long-chain and short-chain linked cellulose derivative (16 g).

The substitution degree with a long-chain organic group ($DS_{LO}$) of the obtained long-chain and short-chain linked cellulose derivative was determined by IR. $DS_{LO}$ was 0.5.

Figure 2:
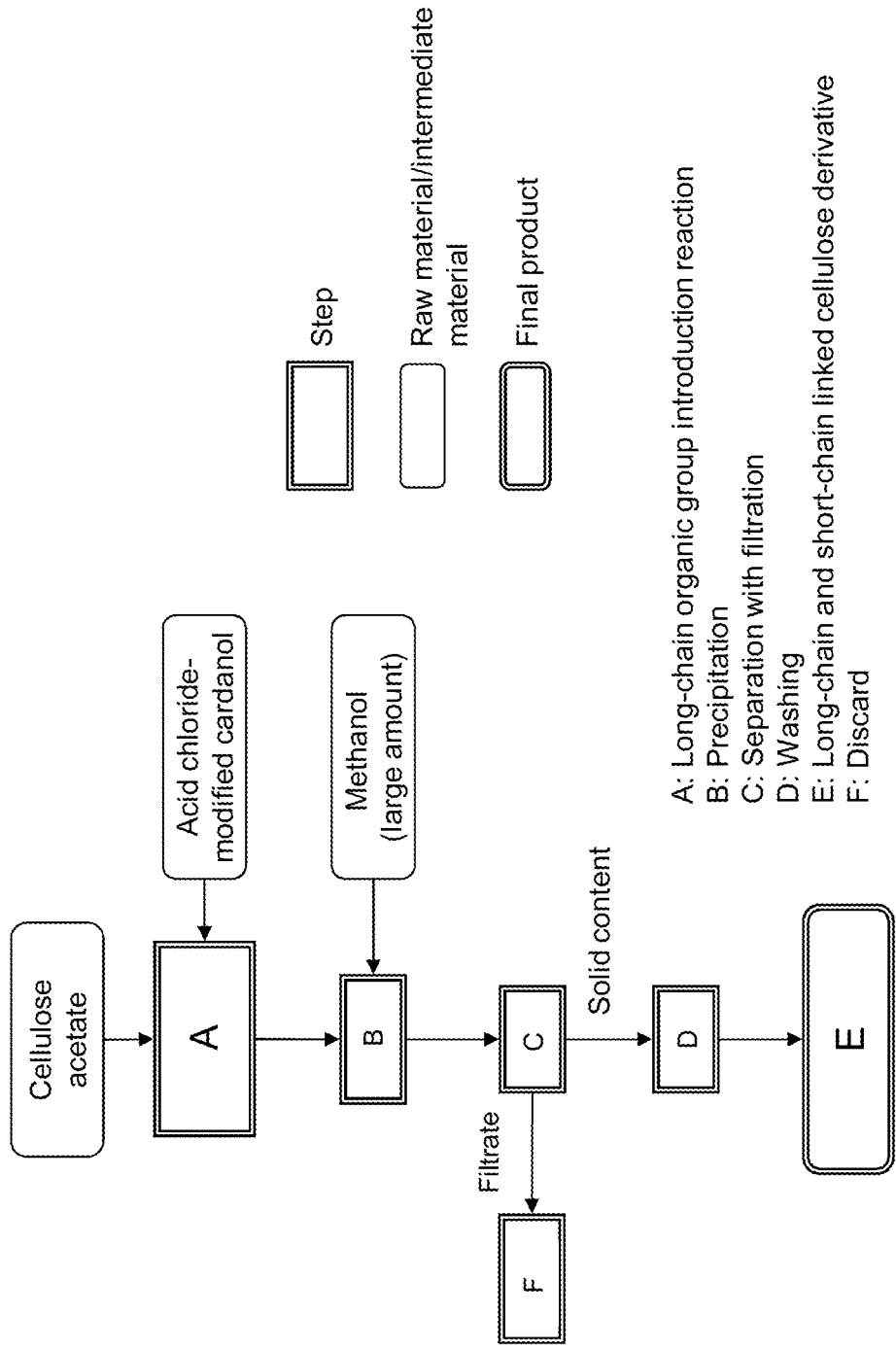
FIG. 2 is a process chart of a Production Example of a cellulose derivative according to a related art.

The process chart of the Comparative Example is shown in FIG. 2.

Example of the Second Process (Single-Stage Reaction Process)

Synthesis Example 5

Synthesis of a Mixture of Short-Chain and Long-Chain Reactants

The carboxylated hydrogenated cardanol of Synthesis Example 2 was mixed with an acetic anhydride and heated to obtain a mixture of the acetic anhydride, an acetic acid-carboxylated hydrogenated cardanol mixed anhydride (asymmetric anhydride: anhydride formed by a dehydration reaction between acetic acid and carboxylated hydrogenated cardanols) and acid anhydride-modified cardanol (symmetric anhydride: anhydride formed by a dehydration reaction between mutual carboxylated hydrogenated cardanol molecules). In short, a mixture of short-chain and long-chain reactants was obtained. More specifically, the mixture of short-chain and long-chain reactants was prepared in accordance with the following procedure.

The carboxylated hydrogenated cardanol of Synthesis Example 2 (21.8 g) was dissolved in dehydrated dioxane (10.2 mL) while heating and acetic anhydride (3.1 mL) was added and stirred while heating at 90° C. for 0.5 hours. In this manner, a mixture of short-chain and long-chain reactants was obtained.

The obtained a mixture of short-chain and long-chain reactants was dissolved in a solvent mixture of deuterated chloroform-deuterated dimethylsulfoxide (volume ratio: 99:1) and measured by $^1$H-NMR (product name: AV-400, 400 MHz, manufactured by Bruker). As a result, the molar ratio of acetic anhydride: acetic acid-carboxylated hydrogenated cardanol mixed anhydride (asymmetric anhydride): acid anhydride-modified cardanol (symmetric anhydride) was 43:36: 21.

Note that the obtained acetic acid-carboxylated hydrogenated cardanol mixed anhydride (asymmetric anhydride) has 25 carbon atoms. The acid anhydride-modified cardanol (symmetric anhydride) has 46 carbon atoms. The long-chain organic group (carboxylated hydrogenated cardanol bound to a hydroxy group of a cellulose via ester bond) produced in Example (described later) has 23 carbon atoms.

Example 4

A long-chain and short-chain linked cellulose derivative was obtained by subjecting a cellulose to an activation treatment, followed by reacting the mixture of short-chain and long-chain reactants of Synthesis Example 5 in a solid-liquid heterogeneous system. More specifically, the long-chain and short-chain linked cellulose derivative was prepared in accordance with the following procedure.

First, the activation treatment of a cellulose was performed by the following method.

A cellulose (product name: KC flock, brand: W-50GK, manufactured by NIPPON PAPER INDUSTRIES Co., Ltd.) (1.74 g) (weight containing an adsorption water of 6.74%) was dispersed in pure water (25 mL). The dispersion solution was stirred for 15 minutes and subjected to suction filtration for 5 minutes to remove pure water. The resultant solid content was dispersed in acetic acid (25 mL), stirred for 15 minutes and subjected to suction filtration for 5 minutes to remove acetic acid. Furthermore, the resultant solid content was dispersed in dehydrated dioxane (25 mL), stirred for 15 minutes and subjected to suction filtration for 5 minutes to remove dioxane. The dispersion in dioxane and removal of dioxane were repeated twice. In this manner, the cellulose activated was obtained.

Next, a cellulose derivative was synthesized by the following method.

The cellulose activated in the above was dispersed in dehydrated dioxane (10 mL). To the dispersion solution, a dioxane solution of dimethylaminopyridine (459 mg) dissolved in dehydrated dioxane (10 mL) was added. Furthermore, a solution prepared by diluting the mixture of short-chain and long-chain reactants of Synthesis Example 5 with dehydrated dioxane (40 mL) was added.

After the solution was stirred while heating at 90° C. for 5 hours, the solution was subjected to separation with filtration and the following treatment in the same manner as in Example 1 to obtain a product (a long-chain and short-chain linked cellulose derivative).

The solid content recovery rate was evaluated in the same manner as in Example 1. It was 95%.

The substitution degree with a short-chain organic group ($DS_{SH}$) and the substitution degree with a long-chain organic group ($DS_{LO}$) of the obtained solid content (a long-chain and short-chain linked cellulose derivative) were determined by IR. As a result, $DS_{SH}$ was 0.9, and $DS_{LO}$ was 0.4. Note that $DS_{SH}$ was a value obtained by subtracting $DS_{LO}$ from the total substitution degree determined based on the intensity of a C=O stretching and shrinking peak (1750 cm$^{-1}$) of an ester bond.

Figure 3:
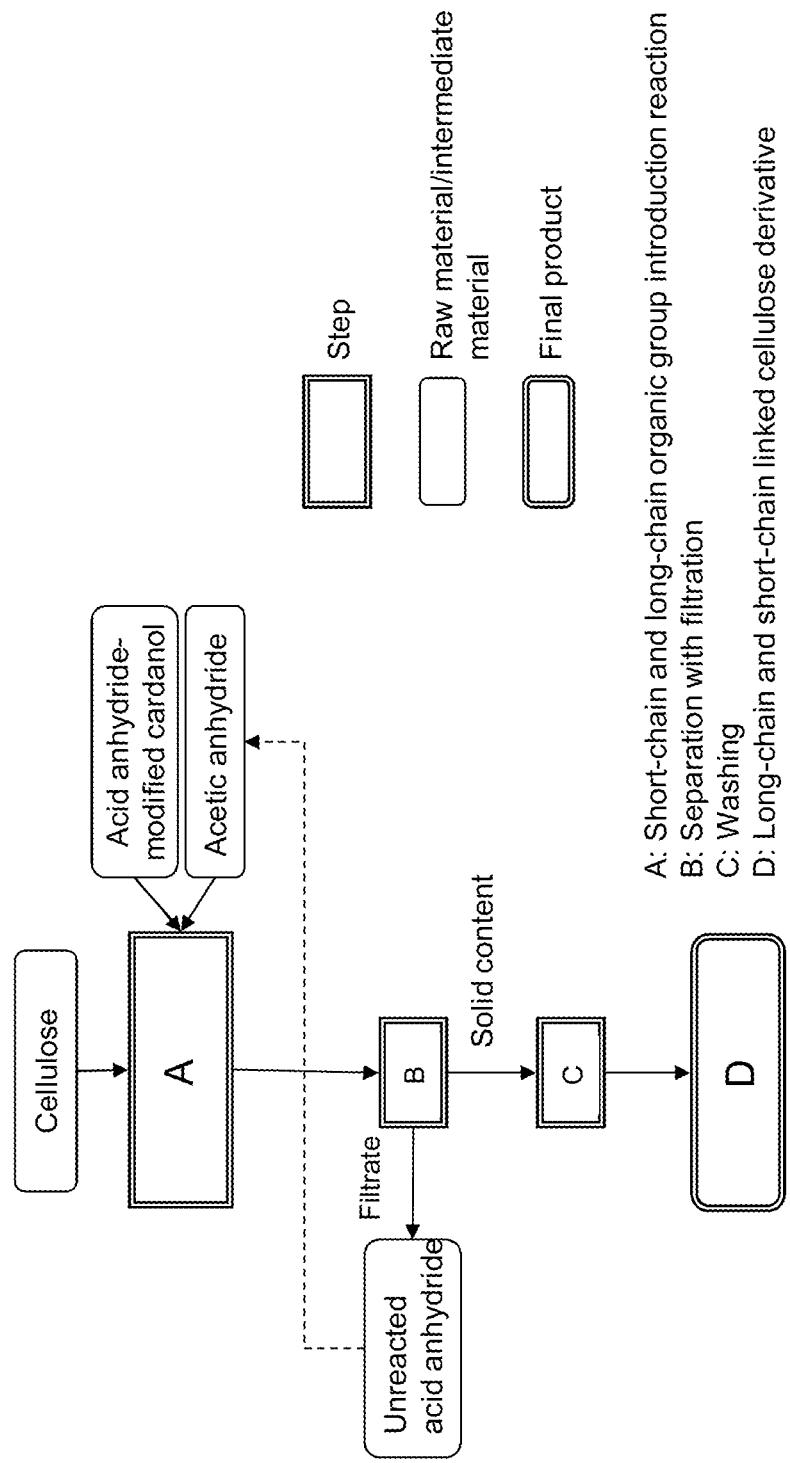
FIG. 3 is a process chart illustrating a Production Example of a cellulose derivative according to another exemplary embodiment of the present invention.

The process chart of the Example is shown in FIG. 3.

Example 5

With a cellulose, the acid anhydride-modified hydrogenated cardanol of Synthesis Example 3 was reacted to obtain a long-chain linked cellulose derivative in the following manner. A product (long-chain linked cellulose derivative) was obtained by performing a reaction, separation with filtration and the following treatment in the same manner as in Example 1 except that the first step was not performed and cellulose was used in place of cellulose acetate. The cellulose (product name: KC flock, brand: W-50GK, amount of hydroxy group: 17.4 mmol, manufactured by NIPPON PAPER INDUSTRIES Co., Ltd.) was used in an amount of 0.94 g.

The solid content recovery rate was evaluated in the same manner as in Example 1. It was 95%.

The substitution degree with a long-chain organic group ($DS_{LO}$) of the obtained solid content (long-chain linked cellulose derivative) was determined by IR. It was 0.2.

Examples and Comparative Examples mentioned above are summarized in Table 1.

heterogeneous system to obtain a long-chain and short-chain linked cellulose derivative (second step). In the second step, synthesis was performed in the same manner as in Example 1 except that the amount of acid anhydride-modified hydrogenated cardanol was set at 4.8 g (6 mmol). The process chart of the Example is shown in FIG. 1.

Example 7

Synthesis was performed in the same manner as in Example 6 except that the amount of dimethylaminopyridine was set at 45 mg (0.37 mmol).

TABLE 1

| | | | | Long-chain organic group introduction reaction | | | | | Substitution degree | |
|---|---|---|---|---|---|---|---|---|---|---|
| | Reaction system | Starting substance | Short-chain reactant | Solvent | Solvent amount (mass ratio to starting substance) | Catalyst | Temperature (° C.) | Reaction time (hr) | $DS_{SH}$ (short-chain) | $DS_{LO}$ (long-chain) |
| Example 1 | Solid-liquid heterogeneous reaction 2 step | Cellulose acetate (Synthetic Example 1) | — | Dioxane | 31 | DMAP | 90 | 5 | 2.3 | 0.7 |
| Example 2 | Solid-liquid heterogeneous reaction 2 step | Cellulose acetate (Synthetic Example 1) | — | Pyridine | 29 | DMAP | 100 | 5 | 2.3 | 0.5 |
| Example 3 | Solid-liquid heterogeneous reaction 2 step | Cellulose acetate (Synthetic Example 1) | — | Pyridine | 29 | DBU | 100 | 5 | 2.3 | 0.4 |
| Example 4 | Solid-liquid heterogeneous reaction 1 step | Cellulose | Present | Dioxane | 45 | DMAP | 90 | 5 | 0.9 | 0.4 |
| Example 5 | Solid-liquid heterogeneous reaction 1 step | Cellulose | Absent | Dioxane | 49 | DMAP | 90 | 5 | 0 | 0.2 |
| Comparative Example 1 | Homogeneous solution reaction 2 step | Cellulose acetate (commercially available product) | — | Dioxane | 269 | Absent | 100 | 5 | 2.1 | 0.5 |

As is apparent from comparison between the processes shown in FIG. 1 and FIG. 3 and the process shown in FIG. 2, as well as apparent from Table 1, it is found that a large amount of poor solvent is required in Comparative Example 1 in recovery of a product; whereas in Examples 1 to 5, solid-liquid separation is performed without using such a poor solvent in a recovery step, with the result that the recovery step is simplified. Furthermore, an unreacted long-chain reactant can be recovered and reused.

As is apparent from comparison between Example 1 and Examples 4 and 5, it is found that affinity of a cellulose for a solvent can be improved by introducing a short-chain organic group in advance with the result that reactivity with a long-chain reactant can be improved.

As is apparent from comparison between the process shown in FIG. 3 and the process shown in FIG. 1, a production step can be simplified by simultaneously introducing a short-chain organic group and a long-chain organic group.

Examples of the First Process (Two-Stage Reaction Process)

Example 6

Cellulose acetate (short-chain linked cellulose derivative) was obtained (first step) by acetylating a cellulose in a solid-liquid heterogeneous system in the same manner as in Synthesis Example 1.

Subsequently, with the cellulose acetate of Synthesis Example 1, the acid anhydride-modified hydrogenated cardanol of Synthesis Example 3 was reacted in a solid-liquid

Example 8

Synthesis was performed in the same manner as in Example 6 except that the amount of dimethylaminopyridine was set at 15 mg (0.12 mmol).

The results of Examples 6 to 8 are summarized together with the results of Example 1 and Comparative Example 1 in Table 2.

TABLE 2

| | Amount of solvent in a long-chain orgaic group introduction reaction (mass ratio to starting substance) | Amount of acid-anhydride modified cardanol (mmol) | Amount of dimethyl-amino-pyridine (mmol) | $DS_{SH}$ (short-chain) | $DS_{LO}$ (long-chain) |
|---|---|---|---|---|---|
| Example 1 | 31 | 12 | 1.5 | 2.3 | 0.7 |
| Example 6 | 31 | 6 | 1.5 | 2.3 | 0.7 |
| Example 7 | 31 | 6 | 0.37 | 2.3 | 0.7 |
| Example 8 | 31 | 6 | 0.12 | 2.3 | 0.6 |
| Comparative Example 1 | 269 | — | — | 2.1 | 0.5 |

As is apparent from comparison between the process shown in FIG. 1 and the process shown in FIG. 2, as well as apparent from Table 2, it is found that a large amount of poor solvent is required in Comparative Example 1 in recovery of a product; whereas in Example 1 and Examples 6 to 8, solid-liquid separation is performed without using such a poor solvent in a recovery step, with the result that the recovery step is simplified. Furthermore, an unreacted long-chain reactant can be recovered and reused.

As is apparent from comparison between Example 1 and Examples 6 to 8, it is found that the reaction efficiently proceeds equally to or more than a conventional method (Comparative Example 1) even if the amounts of acid anhydride-modified cardanol and dimethylaminopyridine are reduced from the conditions of Example 1, in other words, even if the amounts of starting raw materials are reduced.

Examples of the Second Process (Single-Stage Reaction Process)

Synthesis Example 6

Synthesis of a Mixture of Short-Chain and Long-Chain Reactants

A mixture of short-chain and long-chain reactants was prepared in the same manner as in Synthesis Example 5. More specifically, the mixture of short-chain and long-chain reactants was prepared in accordance with the following procedure.

To the carboxylated hydrogenated cardanol (40.2 g (111 mmol)) of Synthesis Example 2, acetic anhydride (21.0 mL (222 mmol)) was added. The mixture was stirred while heating at 100° C. for one hour to obtain a mixture of short-chain and long-chain reactants.

Example 9

After activation treatment of a cellulose was performed, a mixture of short-chain and long-chain reactants of Synthesis Example 6 was reacted in a solid-liquid heterogeneous system to obtain a long-chain and short-chain linked cellulose derivative. More specifically, the long-chain and short-chain linked cellulose derivative was prepared in accordance with the following procedure.

First, an activation treatment of a cellulose was performed by the following method.

A cellulose (product name: KC flock, brand: W-50GK, manufactured by NIPPON PAPER INDUSTRIES Co., Ltd.) (6.0 g) (on a dry basis) was dispersed in pure water (90 mL). The dispersion solution was stirred for 15 minutes and subjected to suction filtration for 5 minutes to remove pure water. The obtained solid content was dispersed in acetic acid (90 mL), stirred for 15 minutes and subjected to suction filtration for 5 minutes to remove acetic acid. The dispersion into acetic acid and the removal of acetic acid were repeated twice. In this manner, the cellulose activated was obtained.

Next, a cellulose derivative was synthesized by the following method.

To the above cellulose activated, a dioxane solution of dimethylaminopyridine (3.0 g) dissolved in dehydrated dioxane (150 mL) was added to obtain a dispersion solution. The dispersion solution was added to the mixture of short-chain and long-chain reactants of Synthesis Example 6.

After the resultant solution was stirred while heating at 100° C. for 6 hours, 10 mL of a reaction suspension solution was taken from the solution and centrifuged (700 G, 5 minutes) to separate a solid and a liquid. The solid content obtained by centrifugation was washed and dried to obtain a product. Washing was repeatedly performed so as not to leave an unreacted substance in consideration of analysis. More specifically, washing was made three times with 20 mL of isopropyl alcohol heated to 60° C.

The substitution degree with the short-chain organic group ($DS_{SH}$) and the substitution degree with a long-chain organic group ($DS_{LO}$) in the obtained solid content (a long-chain and short-chain linked cellulose derivative) were determined by IR. As a result, $DS_{SH}$ was 1.7 and $DS_{LO}$ was 0.2.

Figure 4:
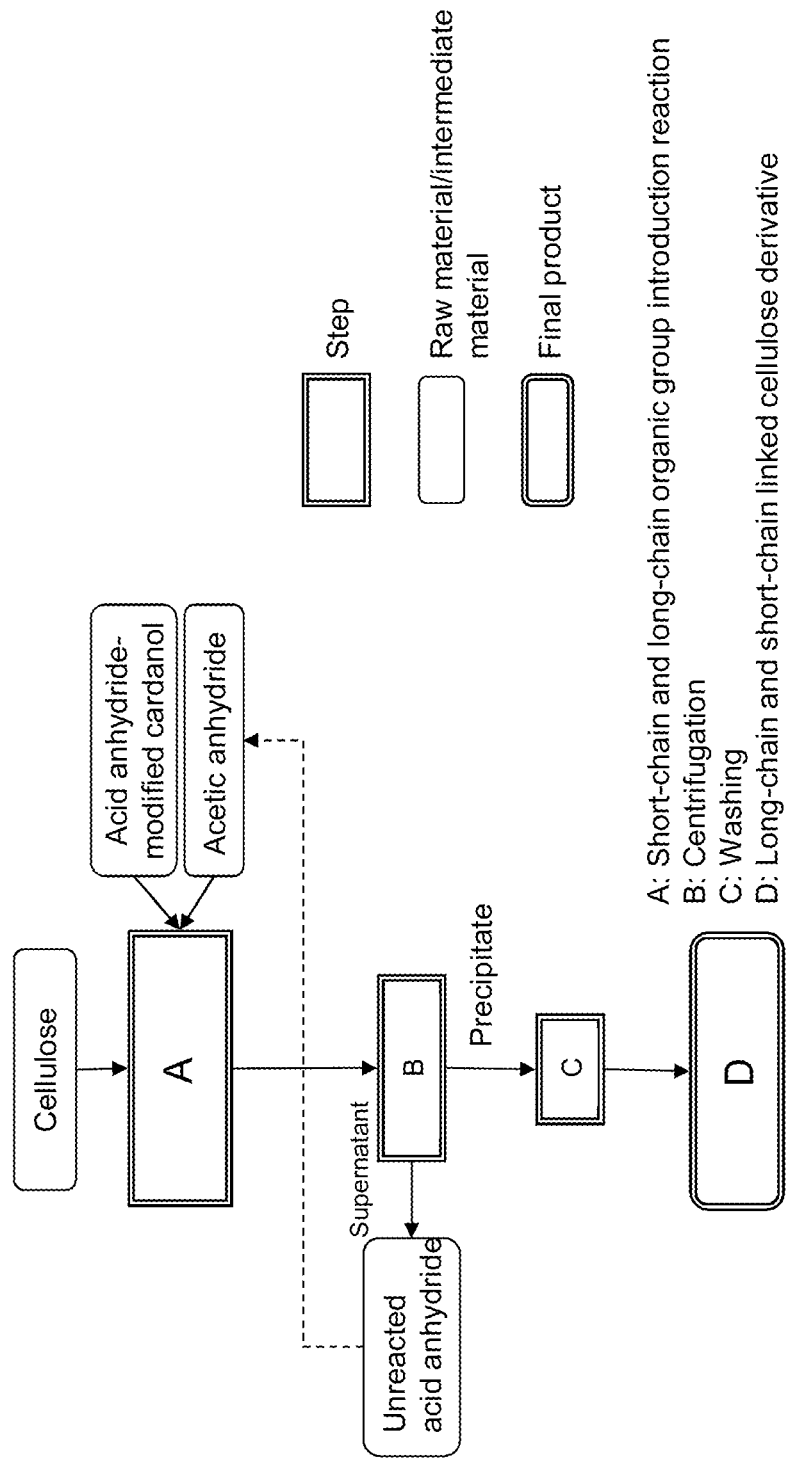
FIG. 4 is a process chart illustrating a Production Example of a cellulose derivative according to another exemplary embodiment of the present invention.

The process chart of the Example is shown in FIG. 4.

Example 10

A long-chain and short-chain linked cellulose derivative was prepared in the same manner as in Example 9 except that 1,2-dimethoxyethane was used as the reaction solvent and the reaction temperature was set at 83° C.

Example 11

A long-chain and short-chain linked cellulose derivative was prepared in the same manner as in Example 9 except that methyl ethyl ketone was used as the reaction solvent and the reaction temperature was set at 80° C.

Example 12

A long-chain and short-chain linked cellulose derivative was prepared in the same manner as in Example 9 except that ethyl acetate was used as the reaction solvent and the reaction temperature was set at 77° C.

The results of Examples 9 to 12 are summarized together with the results of Comparative Example 1 in Table 3.

TABLE 3

| | Solvent | Amount of solvent in a long-chain orgaic group introduction reaction (mass ratio to starting substance) | Reaction temperature (° C.) | $DS_{SH}$ (short-chain) | $DS_{LO}$ (long-chain) |
|---|---|---|---|---|---|
| Example 9 | Dioxane | 26 | 100 | 1.7 | 0.2 |
| Example 10 | 1,2-dimethoxyethane | 22 | 83 | 1.6 | 0.2 |
| Example 11 | Methylethylketone | 20 | 80 | 1.4 | 0.2 |
| Example 12 | Ethyl acetate | 22 | 77 | 1.3 | 0.2 |
| Comparative Example 1 | Dioxane | 269 | 100 | 2.1 | 0.5 |

As is apparent from comparison between the process shown in FIG. 4 and the process shown in FIG. 2, as well as apparent from Table 3, it is found that a large amount of poor solvent is required in Comparative Example 1 in recovery of a product; whereas in Examples 9 to 12, solid-liquid separation is performed without using such a poor solvent in a recovery step, with the result that the recovery step is simplified. Furthermore, an unreacted long-chain reactant can be recovered and reused.

As is apparent from Examples 9 to 12, it is found that, in the present invention, the introduction reaction of a long-chain organic group can efficiently proceed in solvents containing various types of functional groups.

Example 13

A long-chain and short-chain linked cellulose derivative was prepared in the same manner as in Example 9 except that the reaction time for introducing a long-chain organic group was set at 15 hours. The process chart of the Example is shown in FIG. 4.

Example 14

A mixture of short-chain and long-chain reactants was prepared by synthesis in the same manner as in Synthesis Example 6 except that the use amount of acetic anhydride was set at 23 mL (243 mmol). A long-chain and short-chain linked cellulose derivative was prepared using the mixture of short-chain and long-chain reactants in the same manner as in Example 13.

Example 15

A mixture of short-chain and long-chain reactants was prepared by synthesis in the same manner as in Synthesis Example 6 except that the use amount of carboxylated hydrogenated cardanol was 50.0 g (138 mmol). A long-chain and short-chain linked cellulose derivative was prepared using the mixture of short-chain and long-chain reactants in the same manner as in Example 13.

Comparative Example 2

A long-chain and short-chain linked cellulose derivative was prepared in the same manner as in Comparative Example 1 except that the use amount of acid-chlorinated hydrogenated cardanol was set at 15 g (0.035 mol). The process chart of the Comparative Example is shown in FIG. 2.

The results of Examples 13 to 15 and Comparative Example 2 are summarized in Table 4.

TABLE 4

| | Amount of solvent in a long-chain orgaic group introduction reaction (mass ratio to starting substance) | Amount of acetic anhydride (mmol) | carboxylated hydrogenated cardanol (mmol) | $DS_{SH}$ (short-chain) | $DS_{LO}$ (long-chain) |
|---|---|---|---|---|---|
| Example 13 | 26 | 222 | 111 | 2.1 | 0.3 |
| Example 14 | 26 | 243 | 111 | 2.3 | 0.3 |
| Example 15 | 26 | 222 | 138 | 2.1 | 0.4 |
| Comparative Example 2 | 269 | — | — | 2.1 | 0.3 |

As is apparent from comparison between the process shown in FIG. 4 and the process shown in FIG. 2, as well as apparent from Table 4, it is found that a large amount of poor solvent is required in Comparative Example 2 in recovery of a product; whereas in Examples 13 to 15, solid-liquid separation is performed without using such a poor solvent in a recovery step, with the result that the recovery step is simplified. Furthermore, an unreacted long-chain reactant can be recovered and reused.

As is apparent from Examples 13 to 15, in the present invention, it is possible to control the binding amount of short-chain organic group and long-chain organic group by changing the supply amount of a reactant or raw material.

Synthesis Example 7

Synthesis of a Mixture of Short-Chain and Long-Chain Reactants

The carboxylated hydrogenated cardanol of Synthesis Example 2 was mixed with a propionic anhydride and heated to obtain a mixture of the propionic anhydride, propionic acid-carboxylated hydrogenated cardanol mixed anhydride (asymmetric anhydride: an anhydride formed by a dehydration reaction of propionic acid and carboxylated hydrogenated cardanol) and acid anhydride-modified cardanol (symmetric anhydride: an anhydride formed by a dehydration reaction of mutual carboxylated hydrogenated cardanol molecules). In short, a mixture of short-chain and long-chain reactants was obtained. More specifically, the mixture of short-chain and long-chain reactants was prepared in accordance with the following procedure.

To the carboxylated hydrogenated cardanol (22.4 g) of Synthesis Example 2, a propionic anhydride (143 mL) was added and stirred while heating at 90° C. for 0.5 hours. In this manner, a mixture of short-chain and long-chain reactants was obtained.

Example 16

After activation treatment of a cellulose was performed, the mixture of short-chain and long-chain reactants of Synthesis Example 7 was reacted in a solid-liquid heterogeneous system to obtain a long-chain and short-chain linked cellulose derivative. More specifically, the long-chain and short-chain linked cellulose derivative was prepared in accordance with the following procedure.

First, activation treatment of a cellulose was performed in accordance with the following procedure.

A cellulose (product name: KC flock, brand: W-50GK, manufactured by NIPPON PAPER INDUSTRIES Co., Ltd.) (10.74 g) (weight containing an adsorption water of 6.85%) was dispersed in 150 mL of pure water. The dispersion solution was stirred for 15 minutes and subjected to suction filtration for 5 minutes to remove pure water. The resultant solid content was dispersed in 150 mL of propionic acid, stirred for 15 minutes and subjected to suction filtration for 5 minutes to remove propionic acid. The resultant solid content was dispersed in dehydrated dioxane (150 mL), stirred for 15 minutes and subjected to suction filtration for 5 minutes to remove dioxane. In this manner, the cellulose activated was obtained.

Next, a cellulose derivative was synthesized by the following method.

The cellulose activated in the above was dispersed in dehydrated dioxane (30 mL). To the dispersion solution, a solution prepared by diluting the mixture of short-chain and long-chain reactants of Synthesis Example 7 with dehydrated dioxane (150 mL) was added. Furthermore, a dioxane solution of dimethylaminopyridine (1.0 g) dissolved in dehydrated dioxane (30 mL) was added.

After the resultant solution was stirred while heating at 90° C. for 24 hours, a reaction suspension solution (220 mL) was taken from the solution and separated by filtration. The solid content obtained by separation with filtration was washed and dried to obtain a product. Washing was repeatedly performed so as not to leave an unreacted substance in consideration of analysis. More specifically, washing was made five times with 100 mL of dioxane.

The substitution degree with a short-chain organic group ($DS_{SH}$) and the substitution degree with a long-chain organic group ($DS_{LO}$) of the obtained solid content (a long-chain and short-chain linked cellulose derivative) were determined by IR. As a result, $DS_{SH}$ was 2.1 and $DS_{LO}$ was 0.4. Note that $DS_{SH}$ was a value obtained by subtracting $DS_{LO}$ from the total substitution degree determined based on the intensity of a C=O stretching and shrinking peak (1750 cm$^{-1}$) of an ester bond.

Figure 5:
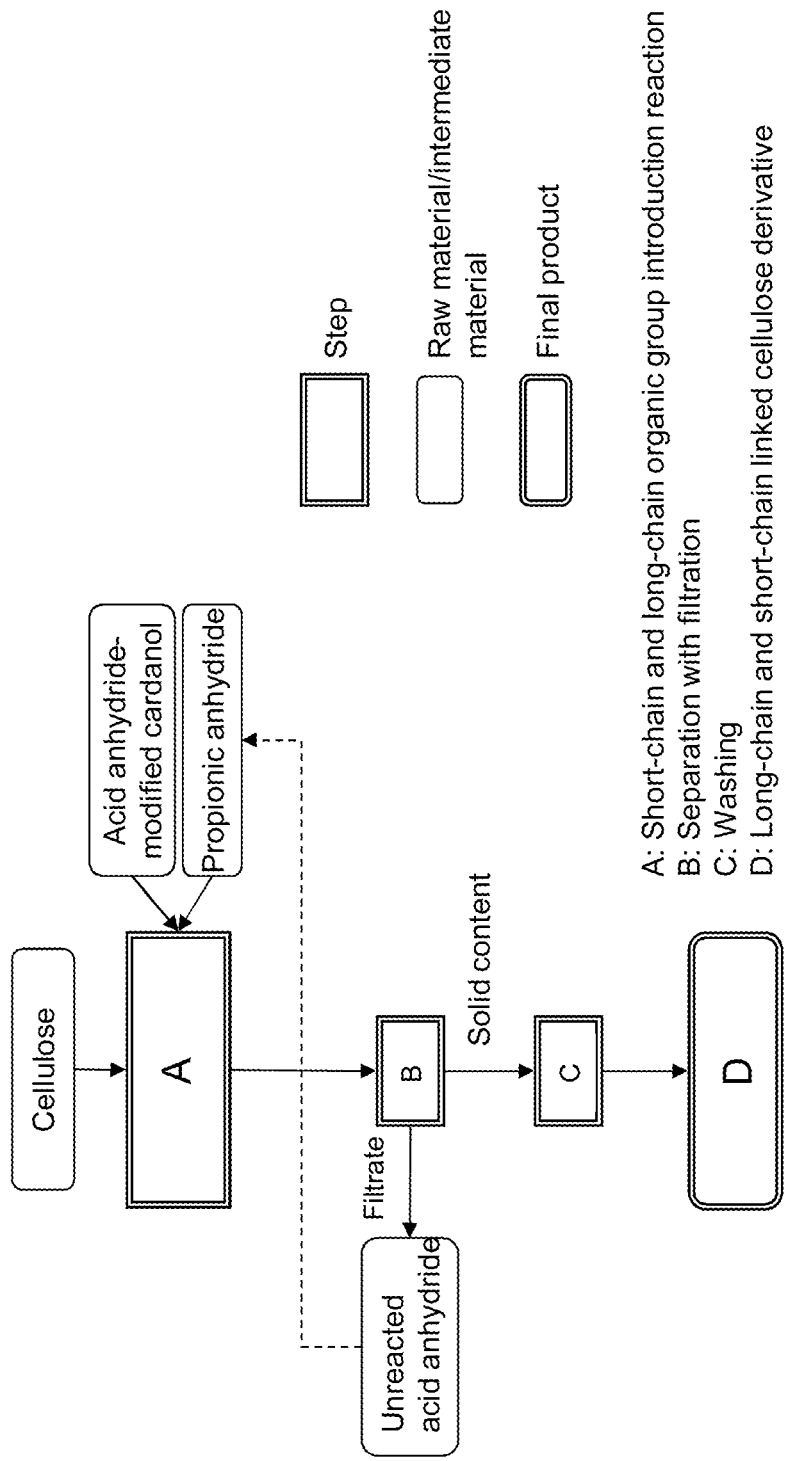
FIG. 5 is a process chart illustrating a Production Example of a cellulose derivative according to another exemplary embodiment of the present invention.

The process chart of the Example is shown in FIG. 5.

The results of Example 16 are summarized together with the results of Comparative Example 2 in Table 5.

TABLE 5

| | Type of short-chain | Amount of solvent in a long-chain orgaic group introduction reaction (mass ratio to starting substance) | $DS_{SH}$ (short-chain) | $DS_{LO}$ (long-chain) |
|---|---|---|---|---|
| Example 16 | Propionic acid | 22 | 2.1 | 0.4 |
| Comparative Example 2 | Acetic acid | 269 | 2.1 | 0.3 |

As is apparent from comparison between the process shown in FIG. 5 and the process shown in FIG. 2, as well as apparent from Table 5, it is found that a large amount of poor solvent is required in Comparative Example 2 in recovery of a product; whereas in Examples 16, solid-liquid separation is performed without using such a poor solvent in the recovery step, with the result that the recovery step is simplified. Furthermore, an unreacted long-chain reactant can be recovered and reused.

As is apparent from the results of Example 16 and other Examples, in the present invention, a long-chain organic group can be efficiently introduced even if the type of short-chain organic group differs.

[Measurement of Degree of Swelling]

Degree of swelling of a sample was determined as follows.

First, a sample before swollen (after dried) was placed on a glass plate and the length (width of a fiber in this case) of the sample before swollen was measured under observation by an optical microscope (trade name: digital microscope, model: VHX-500, manufactured by KEYENCE CORPORATION).

In view of convenience of measurement, in an image under observation, two points at which the line passing through the center of a sample is crossed with the contour of the sample were obtained and the distance between the two points (interval between edges) was measured. The shortest distance was regarded as the length of the sample. If the sample is fibrous form, the center of the sample corresponds to any point on the center axis along the longitudinal direction. If the sample is spherical form, the center of the sample corresponds to the center of the circle (contour) in an image under observation. If the sample has a shape except fibrous form and spherical form, in an image under observation, the contour of a single particle of the sample is surrounded by a square (a rectangular or square) having the smallest area having four corners all having an angle of 90° and the intersection of the diagonal lines of the square can be determined as the center of the sample. If the sample is fibrous form, the diameter (width) of the fiber correspond to the length of sample. If the sample is spherical form, the diameter corresponds to the length of the sample.

After the length of the sample before swollen (after dried) was measured, a solvent was added dropwise to soak the sample in the solvent. In the state where the sample was soaked in the solvent, the length of the sample was measured with time. The length of the sample after the swelling reached saturation was regarded as the length of the sample after swollen and degree of swelling was calculated in accordance with the following expression.

Degree of swelling (%)=100×(length of sample after swollen−length of sample before swollen)/length of sample before swollen.

The degrees of swelling of cellulose derivatives of Synthesis Example 1 and Example 1 were determined at room temperature in accordance with the aforementioned measurement method. Since the sample was fibrous, the diameter (width) of the fiber was measured. Since the swelling of the sample reached saturation within one minute from soaking in solvent, degree of swelling was evaluated at one minute after soaking in the solvent. Note that the length 10 minutes after soaking in the solvent was virtually the same as the length one minute after soaking in the solvent. The obtained results are shown in Table 6.

TABLE 6

| | Degree of swelling (%) | | | |
|---|---|---|---|---|
| | Dioxane | Pyridine | Toluene | Methanol |
| Short-chain linked cellulose derivative (Synthetic Example 1) | 65 | 45 | 0 | 10 |
| Long-chain and short-chain linked cellulose derivative (Example 1) | 90 | 90 | 50 | 5 |

As shown in Table 6, the long-chain and short-chain linked cellulose derivative of Example 1 exhibits a high degree of swelling for dioxane (and pyridine) compared to the other solvents and a high substitution degree as shown in the results of Example 1 (Table 1). Likewise, if a reaction solution capable of attaining high degree of swelling of a long-chain and short-chain linked cellulose derivative is used, it is probably that the cellulose derivative is sufficiently impregnated with a long-chain reactant and the swollen state can be maintained until completion of the reaction, and consequently high reactivity is obtained. Furthermore, a short-chain linked cellulose derivative (Synthesis Example 1) before the reaction (before a long-chain organic group is introduced) also exhibits a high degree of swelling for dioxane (and pyridine) compared to other solvents. As described above, if a reaction solution capable of attaining a high degree of swelling of a cellulose derivative before the reaction is used, it is probably that since a cellulose derivative is sufficiently impregnated with a long-chain reactant even in the beginning of the reaction, and consequently the reaction efficiency is high. It is probably that since a short-chain linked cellulose derivative can exhibit a high degree of swelling compared to a cellulose, the reactivity and the reaction efficiency thereof are high compared to the case where a long-chain organic group is directly introduced into a cellulose.

Production and Evaluation of Molded Body

Example 17

Using the cellulose derivative obtained in Example 13, a molded body was prepared as follows and its physical properties were evaluated.
[Kneading Method]
Using a kneader (trade name: HAAKE MiniLab Rheomex CTW5, manufactured by Thermo Electron Corporation), a cellulose derivative (6.5 g) was kneaded. At this time, the temperature of the kneading chamber of the kneader was set at 210° C. and the rotation number was set at 60 rpm. The raw material was supplied from a supply port of the kneader and kneaded for 3 minutes.
[Molding Method]
Using an injection molding machine (HAAKE MiniJet II, manufactured by Thermo Electron Corporation), a molded body having the following shape was prepared using a resin mentioned above.

The size of molded body: thickness: 2 mm, width: 13 mm, length: 80 mm

At this time, molding conditions were set as follows: the temperature of cylinder of the molding machine: 220° C., the temperature of a mold: 110° C., injection pressure: 1000 bars (100 MPa), injection time: 5 seconds, and a pressure of 400 bar (40 MPa) was kept for 5 seconds.

The obtained molded body was subjected to a bending test in accordance with JIS K7171.

Example 18

A molded body was prepared by using the cellulose derivative of Example 14 in the same manner as in Example 17 and the physical properties thereof were evaluated.

Example 19

A molded body was prepared by using the cellulose derivative of Example 15 in the same manner as in Example 17 and the physical properties thereof were evaluated.

Example 20

A molded body was prepared by using the cellulose derivative of Example 16 in the same manner as in Example 17 and the physical properties thereof were evaluated. However, the temperature during kneading was set at 180° C. and the temperature of a cylinder during molding was set at 200° C.

Comparative Example 3

The long-chain and short-chain linked cellulose derivative of Comparative Example 2 was molded in the same conditions as in Example 17 and their physical properties were evaluated.

The evaluation results of Examples 17 to 20 and Comparative Example 3 are shown in Table 7.

TABLE 7

| | Type of short-chain | $DS_{SH}$ (short-chain) | $DS_{LO}$ (long-chain) | Bending elastic modulus (GPa) |
|---|---|---|---|---|
| Example 17 | Acetic acid | 2.1 | 0.3 | 3.5 |
| Example 18 | Acetic acid | 2.3 | 0.3 | 3.3 |
| Example 19 | Acetic acid | 2.1 | 0.4 | 3.0 |
| Example 20 | Propionic acid | 2.1 | 0.4 | 2.6 |
| Comparative Example 3 | Acetic acid | 2.1 | 0.3 | 2.3 |

As is apparent from Table 7, according to the present invention, a resin having a high bending elastic modulus can be obtained. Furthermore, the bending elastic modulus can be controlled depending upon the types and introduction amounts of short-chain organic group and long-chain organic group.

Example 21

A resin composition was prepared using the obtained cellulose derivative in the same manner as in Example 1. Using the resin composition, a molded body was prepared as follows and the physical properties thereof were evaluated.
[Kneading Method]
Using a kneader (trade name: HAAKE MiniLab Rheomex CTW5, manufactured by Thermo Electron Corporation), two types of raw materials, more specifically, a cellulose derivative (1.3 g) obtained in the same manner as in Example 1 and a cellulose derivative (5.2 g) obtained in the same manner as in Comparative Example 1 were kneaded (6.5 g in total). At this time, the temperature of the kneading chamber of the kneader was set at 200° C. and the rotation number was set at 60 rpm. The raw materials were supplied from a supply port of the kneader and kneaded for 3 minutes to obtain a resin composition.
[Molding Method]
Using an injection molding machine (HAAKE MiniJet II, manufactured by Thermo Electron Corporation), molded bodies having the following two types of shapes were prepared using the above resin composition.

(Molded body 1) The size of molded body: thickness: 2 mm, width: 13 mm, length: 80
(Molded body 2) The size of molded body: thickness: 4 mm, width: 10 mm, length: 80 mm At this time, molding conditions were set as follows: the temperature of cylinder of the molding machine: 210° C., the temperature of a mold: 110° C., injection pressure: 1000 bars (100 MPa), injection time: 5 seconds, and a pressure of 400 bar (40 MPa) was kept for 5 seconds.

The obtained molded bodies were evaluated as follows. The results are shown in Table 8.
[Measurement of Izod Impact Strength]
Notch izod impact strength of Molded body 2 was measured in accordance with JIS K7110.
[Bending Test]
Molded body 1 was subjected to a bending test in accordance with JIS K7171.

Comparative Example 4

A molded body was prepared in the same manner as in Examples 21 except that the cellulose derivative (6.5 g) (product obtained in a homogeneous system) obtained in the same manner as in Comparative Example 1 was used in place of the resin composition, and the physical properties of the molded body were evaluated.

TABLE 8

| | Composition of molded body (mass ratio) (product in solid-liquid heterogeneous system/ product in homogeneous sytem) | Impact strength (kJ/m²) | Bending strength (MPa) | Bending elastic modulus (GPa) | Bending breaking strain (%) |
|---|---|---|---|---|---|
| Example 21 | 20/80 | 4.2 | 53 | 1.4 | >10 |
| Comparative Example 4 | 0/100 | 4.2 | 63 | 2.0 | >10 |

From the results, it is found that if a resin composition containing the cellulose derivative according to the Example, which is controlled in introduction amount of long-chain organic group and degree of crosslinking is used, bending elastic modulus can be reduced while keeping impact strength of a molded body and without losing bending strength significantly. The molded body according to the Example is obtained by mixing cellulose derivatives with each other. Therefore, a molded body having excellent compatibility and stable quality can be obtained according to the Example.

Having thus described the present invention with reference to the exemplary embodiments and Examples, the present invention is not limited to the above-described exemplary embodiments and Examples. Various modifications understandable to those skilled in the art may be made to the constitution and details of the present invention within the scope thereof.

This application claims the right of priority based on Japanese Patent Application No. 2012-125284 filed May 31, 2012, the entire content of which are incorporated herein by reference.

The invention claimed is:

1. A process for producing a cellulose derivative, comprising:
    reacting a reactant and a cellulose or a derivative thereof in a solid-liquid heterogeneous system to form a cellulose derivative containing a long-chain organic group having 5 or more carbon atoms introduced therein, in a swollen state; and
    performing solid-liquid separation to obtain the cellulose derivative containing a long-chain organic group introduced therein, wherein a solubility of the cellulose derivative having a long-chain organic group introduced therein, in a reaction solution of the solid-liquid heterogeneous system, is 10% by mass or less.

2. The process for producing a cellulose derivative according to claim 1, wherein a degree of swelling of the cellulose derivative in the swollen state falls within a range of 10 to 300%.

3. The process for producing a cellulose derivative according to claim 1, wherein the reaction is performed in the presence of a solvent dissolving the reactant.

4. The process for producing a cellulose derivative according to claim 3, wherein the solvent is an aprotic solvent.

5. The process for producing a cellulose derivative according to claim 4, wherein the reaction is performed in the presence of a basic catalyst.

6. The process for producing a cellulose derivative according to claim 1, wherein the reactant has a functional group capable of reacting with a hydroxy group.

7. The process for producing a cellulose derivative according to claim 1, wherein the reactant includes a long-chain reactant for introducing a long-chain organic group having 5 or more carbon atoms.

8. The process for producing a cellulose derivative according to claim 7, wherein the long-chain reactant is a long-chain acylating agent for introducing a long-chain acyl group having 5 to 48 carbon atoms.

9. The process for producing a cellulose derivative according to claim 8, wherein the long-chain acylating agent includes a cardanol derivative.

10. The process for producing a cellulose derivative according to claim 9, wherein the cardanol derivative has an acid anhydride group.

11. The process for producing a cellulose derivative according to claim 7, wherein the reactant further includes a short-chain reactant for introducing a short-chain organic group having 4 or less carbon atoms.

12. The process for producing a cellulose derivative according to claim 11, wherein the short-chain reactant is a short-chain acylation agent for introducing a short-chain acyl group having 2 to 4 carbon atoms.

13. The process for producing a cellulose derivative according to claim 12, wherein the short-chain acylation agent includes at least one of an acylation agent having an acetyl group and an acylation agent having a propionyl group.

14. The process for producing a cellulose derivative according to claim 1, further comprising a step of forming a short-chain linked cellulose derivative by introducing a short-chain organic group having 4 or less carbon atoms into a cellulose in a solid-liquid heterogeneous system,
    wherein the cellulose derivative containing a long-chain organic group introduced therein is formed by reacting the short-chain linked cellulose derivative and the reactant.

15. The process for producing a cellulose derivative according to claim 14, wherein the short-chain linked cellulose derivative is in a swollen state at the time of initiating a reaction with the reactant.

16. The process for producing a cellulose derivative according to claim 14, wherein
    the short-chain linked cellulose derivative is a short-chain acylated cellulose derivative obtained by substituting a part of hydrogen atoms of hydroxy groups of a cellulose with a short-chain acyl group having 2 to 4 carbon atoms, and
    the reactant is a long-chain acylating agent for introducing a long-chain acyl group having 5 to 48 carbon atoms.

17. The process for producing a cellulose derivative according to claim 16, wherein the long-chain acylating agent includes a cardanol derivative.

18. The process for producing a cellulose derivative according to claim 17, wherein the cardanol derivative has an acid anhydride group.

19. The process for producing a cellulose derivative according to claim 14, wherein the short-chain organic group includes at least one of an acetyl group and a propionyl group.

20. The process for producing a cellulose derivative according to claim 14, wherein the short-chain linked cellulose derivative has a crosslinking site.

21. The process for producing a cellulose derivative according to claim 20, wherein the crosslinking site is a remaining intermolecular linking site derived from an intermolecular linking site of the cellulose.

22. The process for producing a cellulose derivative according to claim 1, wherein a cellulose is used as the cellulose or a derivative thereof before the reaction.

23. The process for producing a cellulose derivative according to claim 22, wherein the cellulose is subjected to an activation treatment before the reaction.

24. The process for producing a cellulose derivative according to claim 1, wherein the cellulose derivative containing a long-chain organic group introduced therein has a crosslinking site.

25. The process for producing a cellulose derivative according to claim 24, wherein the crosslinking site is a remaining intermolecular linking site derived from an intermolecular linking site of the cellulose.

26. The process for producing a cellulose derivative according to claim 24, further comprising a step of dissociating the crosslinking site after the solid-liquid separation.

27. A cellulose derivative produced by the process of claim 1.

28. A resin composition comprising a cellulose derivative of claim 27.

29. A molded body obtained by molding the resin composition of claim 28.

* * * * *